(12) United States Patent
Wallace et al.

(10) Patent No.: US 11,898,431 B2
(45) Date of Patent: Feb. 13, 2024

(54) METHODS AND SYSTEMS FOR TREATING HYDRAULICALLY FRACTURED FORMATIONS

(71) Applicant: Universal Chemical Solutions, Inc., Dripping Springs, TX (US)

(72) Inventors: Tadd Wallace, Osceola, MO (US); Kevin Lange, Houston, TX (US); Dave Szabo, Anchorage, AL (US); Susan Starr, Anchorage, AK (US); Andrea Balestrini, Sugar Land, TX (US)

(73) Assignee: Universal Chemical Solutions, Inc., Austin, TX (US)

( * ) Notice: Subject to any disclaimer, the term of this patent is extended or adjusted under 35 U.S.C. 154(b) by 0 days.

(21) Appl. No.: 17/488,029

(22) Filed: Sep. 28, 2021

(65) Prior Publication Data

US 2022/0145741 A1 May 12, 2022

Related U.S. Application Data

(60) Provisional application No. 63/084,645, filed on Sep. 29, 2020, provisional application No. 63/084,653,
(Continued)

(51) Int. Cl.
*E21B 43/267* (2006.01)
*C09K 8/68* (2006.01)
(Continued)

(52) U.S. Cl.
CPC ............ *E21B 43/267* (2013.01); *C09K 8/68* (2013.01); *C09K 8/80* (2013.01); *E21B 43/2605* (2020.05)

(58) Field of Classification Search
None
See application file for complete search history.

(56) References Cited

U.S. PATENT DOCUMENTS 3,330,345 A 7/1967 Henderson et al.
3,482,632 A * 12/1969 Holm ............... C09K 8/584
166/275

(Continued)

FOREIGN PATENT DOCUMENTS

WO WO2010071994 A1 7/2010

OTHER PUBLICATIONS

Kevin Raterman et al. "Analysis of a Multi-Well Eagle Ford Pilot." 2020, Unconventional Resources Technology Conference, Austin, Texas.

(Continued)

*Primary Examiner* — Anuradha Ahuja
(74) *Attorney, Agent, or Firm* — Elliott Law PLLC; Douglas H. Elliott; Nathan Q. Huynh

(57) ABSTRACT

Disclosed herein are methods for treating hydrocarbon-bearing formations previously subjected to hydraulic fracturing, in which at least some of the methods include pumping into a wellbore a treatment composition comprising LPG combined with one or more surfactants each of which is fully or partially dissolved into the LPG, causing the treatment composition to make contact with water residing in the formation such that at least a portion of the one or more surfactants dissolves into the water, and recovering a composition that includes residual hydrocarbons and at least some of the LPG and water that resided in the formation and at least some of the one or more surfactants that were pumped into the wellbore.

17 Claims, 9 Drawing Sheets

Related U.S. Application Data filed on Sep. 29, 2020, provisional application No. 63/084,659, filed on Sep. 29, 2020.

(51) Int. Cl.
*C09K 8/80* (2006.01)
*E21B 43/26* (2006.01)

(56) References Cited

U.S. PATENT DOCUMENTS

| | | | |
|---|---|---|---|
| 3,718,586 | A | 2/1973 | Rollo et al. |
| 3,777,820 | A * | 12/1973 | Weaver ................ E21B 43/32 |
| | | | 166/305.1 |
| 3,933,205 | A | 1/1976 | Kiel |
| 4,017,405 | A * | 4/1977 | Holm .................... C09K 8/584 |
| | | | 507/938 |
| 8,025,099 | B2 | 9/2011 | Mesher |
| 8,276,659 | B2 | 10/2012 | Fordyce et al. |
| 8,408,289 | B2 | 4/2013 | Loree |
| 8,689,876 | B2 | 4/2014 | Loree et al. |
| 8,707,978 | B2 | 4/2014 | Gatlin et al. |
| 8,871,693 | B2 | 10/2014 | Mesher et al. |
| 8,951,941 | B2 | 2/2015 | Gatlin et al. |
| 8,993,492 | B2 | 3/2015 | Gatlin et al. |
| 9,096,788 | B2 | 8/2015 | Mesher et al. |
| 9,103,190 | B2 | 8/2015 | O'Rourke et al. |
| 9,488,040 | B2 | 11/2016 | Chakrabarty et al. |
| 9,631,471 | B2 | 4/2017 | Fordyce |
| 9,683,432 | B2 | 6/2017 | Fordyce |
| 9,759,053 | B2 | 9/2017 | Mendell |
| 9,932,808 | B2 | 4/2018 | Sheng |
| 10,570,715 | B2 | 2/2020 | Babcock et al. |
| 2001/0050172 | A1 * | 12/2001 | Tolman ................ E21B 33/12 |
| | | | 166/305.1 |
| 2011/0105370 | A1 | 5/2011 | Mesher et al. |
| 2011/0120712 | A1 | 5/2011 | Todd et al. |
| 2011/0143971 | A1 | 6/2011 | Mesher et al. |
| 2011/0284230 | A1 | 11/2011 | Loree et al. |
| 2012/0318514 | A1 | 12/2012 | Mesher |
| 2013/0161016 | A1 | 6/2013 | Loree et al. |
| 2013/0168086 | A1 | 7/2013 | Roberts |
| 2013/0299159 | A1 | 11/2013 | O'Rourke et al. |
| 2013/0299167 | A1 | 11/2013 | Fordyce et al. |
| 2014/0124208 | A1 | 5/2014 | Loree et al. |
| 2015/0157995 | A1 | 6/2015 | Fordyce et al. |
| 2016/0002521 | A1 | 1/2016 | Dillon et al. |
| 2016/0003017 | A1 * | 1/2016 | Keller .................. E21B 43/162 |
| | | | 166/250.1 |
| 2019/0264097 | A1 | 9/2019 | Dusterhoft et al. |
| 2021/0292638 | A1 | 9/2021 | Chopade et al. |

OTHER PUBLICATIONS

Stephen Rassenfoss. "Solving the Gummy Bears Mystery May Unlock Greater Shale Production." Sep. 1, 2020, JPT Emerging Technology Editor.

J. Brandon Rogers et al. "A Simulation Case Study of Gas Injection Pilot in Eagle Ford." 2020, Society of Petroleum Engineers.

D.V.S. Gupta. "Unconventional Fracturing Fluids for Tight Gas Reservoirs." 2009, Society of Petroleum Engineers.

M. M. Sharma & R. Manchanda. "The Role of Induced Un-propped (iU) Fractures in Unconventional Oil and Gas Wells." 2015, Society of Petroleum Engineers.

Tadesse Weldu Teklu et al. "Fracture and Matrix Permeability Hysteresis in Organic Rich Mudrocks." 2016, Unconventional Resources Technology Conference, Austin, Texas.

* cited by examiner

METHODS AND SYSTEMS FOR TREATING HYDRAULICALLY FRACTURED FORMATIONS

CROSS REFERENCE TO RELATED APPLICATIONS

This application claims priority to provisional application Ser. No. 63/084,645, filed Sep. 29, 2020; Ser. No. 63/084,653, filed Sep. 29, 2020; and Ser. No. 63/084,659, filed Sep. 29, 2020; and this application hereby incorporates herein those applications as if set forth herein in their entireties, and claims priority to each of the filing dates of those applications.

BACKGROUND

1. Field of Inventions

The field of this application and any resulting patent is the treatment of oil or gas formations that have been previously subjected to hydraulic fracturing.

2. Description of Related Art

Various methods, compositions, and systems, including assemblies, apparatuses, and devices, have been proposed and utilized for treating hydraulically fractured formations to recover hydrocarbons remaining in the formations. Some of the methods, compositions, and systems are disclosed in the patents, patent publications, and other potentially prior art references appearing on the face of this patent, and the contents of those documents should be consulted for an accurate understanding of what might be considered the contents of prior art. However, it is contemplated that those methods, compositions, systems lack the various combinations of steps and/or elements of the methods and/or systems recited in the patent claims below. Furthermore, it is contemplated that the methods, compositions and/or systems covered by at least some of the claims of this issued patent solve problems that at least some of the prior art methods and/or systems have failed to solve. Further, as discussed further below, there are certain features, elements and benefits of certain claims that would have been surprising and unexpected to a person of ordinary skill in the art based on the prior art existing as of the filing date of this application.

In general, one of the problems the methods, compositions, and systems covered by the claims herein are directed to solving is the declining production from wells that have been drilled and subjected to hydraulic fracturing. Vast amounts of oil and gas reserves exist in subterranean oil and gas reservoirs, particularly in shale reservoirs, extra tight rock reservoirs, and heavy or viscous oil reservoirs some of which are sometimes referred to as unconventional reservoirs. Horizontal well drilling followed by hydraulic fracturing has been performed extensively resulting in oil and gas production from many of those reservoirs. However, production from many of those wells tends to decline rapidly, particularly as the natural reservoir pressures near the wellbores decline. In some wells, there have been declines of 40% to 50% in first-year production rates alone.

There have been various explanations given for the tendency of a hydraulically fractured well to exhibit declining production including, for example, the presence of debris and/or precipitates that block flow into or from the horizontal portion of the wellbore; damage to certain parts of the formation due to trapped water or water-based fracturing fluids from the previous fracturing operation; partial closures of parts of the fracture system; and/or slow recharge rates of the depleted area around the wellbore due to the low permeability of the tight formation. The methods, compositions, and systems described and/or claimed herein are directed to increasing production from a well that has suffered from declining production regardless of the reason for the decline.

SUMMARY

Disclosed herein are methods, systems, and compositions for treating hydrocarbon-bearing formation previously subjected to hydraulic fracturing. One or more of the methods comprise (include) pumping into the wellbore a treatment composition comprising LPG combined with one or more surfactants each of which is fully or partially dissolved into the LPG, and the treatment compositions may also include a non-emulsifier that is fully or partially dissolved into the LPG and a defoamer that is fully or partially dissolved into the LPG. One or more of those methods may also include causing the treatment composition to make contact with water residing in the formation, preferably such that at least most of the one or more surfactants partitions into the water. One or more of the methods may also include recovering a composition that includes residual hydrocarbons and at least some of the LPG and water that resided in the formation and at least some of the one or more surfactants that were pumped into the wellbore.

One or more of the methods for treating hydrocarbon-bearing formations previously subjected to hydraulic fracturing may include, alternatively, or in addition: (a) pumping into the wellbore a first volume of treatment composition comprising LPG; (b) pumping into the wellbore a second volume of treatment composition comprising LPG and a diverter; (c) pumping into the wellbore a third volume of treatment composition comprising LPG; and (d) recovering hydrocarbons and water previously residing in the formation, and at least a portion of the LPG previously pumped into the wellbore.

DETAILED DESCRIPTION

1. Introduction

Figure 1:
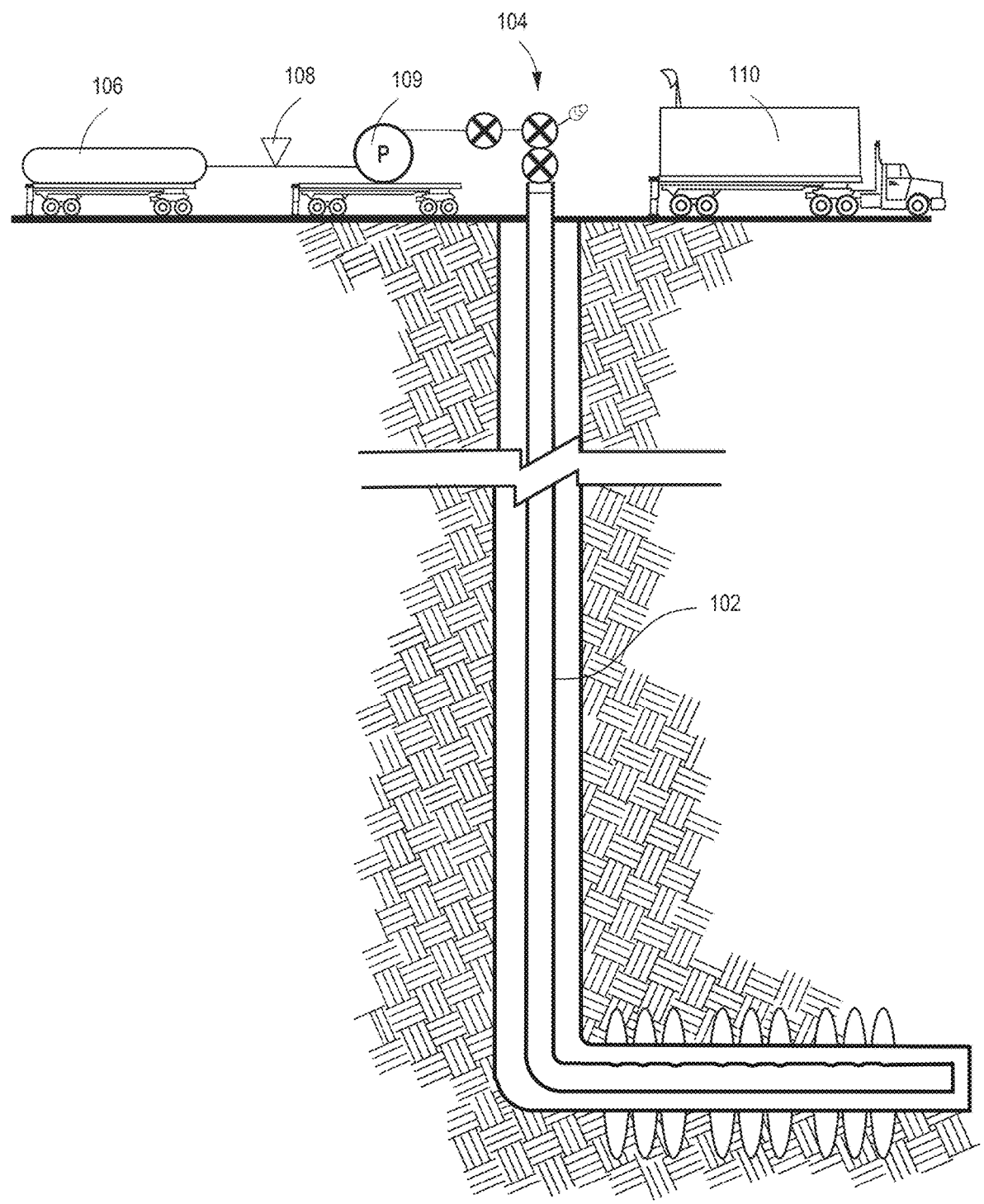
FIG. 1 depicts an assembly used to treat a formation that was previously hydraulically fractured.

A detailed description will now be provided. The purpose of this detailed description, which includes the drawings, is to satisfy the statutory requirements of 35 U.S.C. § 112. For example, the detailed description includes a description of the inventions defined by the claims and sufficient information that would enable a person having ordinary skill in the art to make and use the inventions. In the figures, like elements are generally indicated by like reference numerals regardless of the view or figure in which the elements appear. The figures are intended to assist in providing the description of the inventions and to provide a visual representation of certain aspects of the subject matter described herein. The figures are not all necessarily drawn to scale, nor do they show all the structural details of the systems, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments of the inventions (e.g., versions and/or examples), but the inventions are not limited to these specific embodiments, which are included to enable a person having ordinary skill in the art to make and use the inventions when the information in this patent is combined with available information and technology.

Various terms as used herein are defined below, and the definitions should be adopted when construing the claims that include those terms, except to the extent a different definition is given elsewhere within the specification or in express representations to the United States Patent and Trademark Office (USPTO). To the extent a term used in a claim is not defined in this detailed description or in any representation to the PTO, that term should be given the broadest definition persons having skill in the art have given that term as reflected in at least one printed publication, dictionary, published patent application, or issued patent.

2. Selected Definitions

Certain claims include one or more of the following terms which, as used herein, are expressly defined below.

The term "connected to" as used herein is defined as being directly or indirectly in fluid communication with. Thus, any hydraulic fracture may be connected to a portion of the matrix as well as to other hydraulic fractures and the inner space in a wellbore that leads back to the surface.

The term "providing" as used herein is defined as making available, furnishing, supplying, equipping, or causing to be placed in position.

The terms "first" and "second" as used herein are terms that differentiate two things or actions, and do not signify anything else, including order of importance, sequence, etc.

The term "wellbore" as used herein is defined as any drilled elongated cylindrical borehole extending through a formation, from the earth's surface, where the drilling of the borehole was initiated, to the endpoint where the drilling was terminated. Depending on the context, the term may also include any downhole components placed within the borehole, e.g., casing, cement, tubing, packers, etc. The term "wellbore area" or "wellbore region" is defined as the area surrounding a wellbore that includes a hydraulically fractured system.

The term "well" as used herein is defined as the wellbore in combination with any related surface equipment outside the wellbore, such as pumps and piping.

The term "horizontal wellbore" as used herein is defined as a wellbore that has been drilled using some type of directional drilling technique and includes at least a portion that is more than 45 degrees from vertical. However, at least a portion of any horizontal wellbore is vertical or at least substantially vertical, as the term "vertical" is used in the oil and gas industry, i.e., pointed toward the center of the earth. For example, the upper portion of the wellbore closest to the surface is typically vertical, or substantially vertical, and the lower portion is less vertical and closer to perfectly horizontal relative to the earth's surface above that portion of the wellbore. For example, a horizontal wellbore may include a wellbore that is formed as a kick-out wellbore from an originally drilled vertical wellbore. Any horizontal wellbore mentioned herein is defined to include a "heel," which is the part, point, or section of the wellbore where the portion of the wellbore changes from being vertical to being horizontal, and the "toe" which refers to the end of the wellbore. In any discussion of wellbores herein, there is no restriction in length unless stated specifically otherwise.

The term "hydrocarbon" as used herein is defined as any type of hydrocarbon, that is, any molecule consisting exclusively of the elements of hydrogen and carbon, regardless of size, state, or location. Hydrocarbons may be residual hydrocarbons in the hydraulic fractures or in the formation matrix, as well as hydrocarbons residing in the wellbore, and hydrocarbons at or above the surface. Thus, the term hydrocarbon includes any oil or gas capable of being produced from the well. The term hydrocarbon also includes LPG, such as propane, butane, pentane, etc.

The term "residual hydrocarbon" as used herein is defined as a hydrocarbon that resides in any fully or partially depleted reservoir area adjacent to a wellbore or between wellbores, whether in a matrix or in a fracture, after primary production from a hydraulic fracturing operation. Another term for residual hydrocarbon, as used herein, is formation hydrocarbon which resides in the wellbore region, including at the time any of the treatments described herein are contemplated.

The term "LPG" refers to liquefied petroleum gas, and as used herein the terms LPG and liquefied petroleum gas are both defined as any hydrocarbon or mixture of hydrocarbons that includes ethane, propane, and/or butane, and that has at one point been converted to liquid form above the surface. The term "LPG" includes natural gas liquids sometimes referred to as "NGLs." As described elsewhere herein with respect to certain disclosed treatment methods, LPG is part of a treatment composition that is pumped into a wellbore at pressures that maintain it in its liquid form. However, after residual hydrocarbons in the hydraulic fractures and/or the matrix are contacted with the treatment composition, and the well is returned to production, the production composition being recovered may include previously injected LPG that has been converted to gas form.

Preferably, as discussed elsewhere herein, during practice of the methods described herein, the LPG in the treatment composition makes contact with residual oil trapped in the formation, e.g., in fractures and the matrix, and mixes with this oil forming a mixture, which has a lower viscosity than the residual oil alone. The LPG and residual oil are miscible with one another. The residual oil tends to be heavier than the LPG, which is a light hydrocarbon. The LPG not only forms a mixture that has a lower viscosity than the residual oil itself, but also enables the residual oil to flow more easily when mixed with the LPG than not mixed with the LPG, making it easier for the residual oil to be released from the formation as part of the miscible mixture with LPG. Furthermore, increasing the pressure within the formation, e.g., in the pre-existing fractures and matrix, adds energy to the composition that is being recovered from the formation during a flowback stage of the treatment method, and the added energy mechanically aids in those fluids being recovered during the production following the treatment of the formation with the treatment composition.

The term "composition" as used herein is defined as any combination of any type of gas(es), liquid(s), or solid(s), regardless of form, and includes any mixture of any gas(es), liquid(s), or solid(s), where the term "mixture" is defined to include a single-phase solution and a multi-phase (including two-phase) mixture or suspension, including a mixture that includes suspended solids such as diverter balls. At least one type of composition is a treatment composition.

The term "treatment composition" as used herein is defined as LPG alone or in combination with at least one other component, such as a surfactant. The treatment composition refers to the LPG being pumped into the wellbore but not the LPG that is recovered as part of the production fluid. A treatment composition may be a single-phase solution that includes LPG along with the surfactant(s) and other components, but may also be a multi-phase solution. The treatment composition is preferably in liquid form, and in certain specific embodiments is defined to include a chemical diverter and/or a mechanical diverter (e.g., solid diverter balls) which in other specific embodiments may be identified as separate components, i.e., mixed with the treatment composition.

The term "solubility agent" as used herein is defined as any compound or combination of compounds that function as a partial or complete solvent with respect to LPG, water, and/or residual hydrocarbons. In one or more specific embodiments, the solubility agent includes at least one alcohol ethoxylate surfactant. In one or more specific embodiments, the solubility agent includes a polyester non-emulsifier and/or a a tetra-substituted ammonium salt having one or more of the alkyl substituents that is a fatty or fatty derivative moiety. In one or more specific embodiments, the solubility agent includes an alcohol-based defoamer.

The term "surfactant" as used herein is defined as any surface active agent or wetting agent capable of reducing the surface tension of a liquid. The term "surfactant" (singular) also includes "surfactants" (plural) since the treatment composition used in the treatment methods disclosed herein may include a combination (mixture, blend or solution) of two or more different chemical compounds each of which is, individually, a surfactant, and since the combination also functions as a surfactant. An example of a surfactant is an "alcohol ethoxylate" which as used herein is defined as any compound that is the product of the reaction of alcohol (e.g., lauryl alcohol) with ethylene oxide. Preferably, the surfactant(s) used in the practice of the treatment method disclosed herein is a linear or branched fatty alcohol with an ethoxylation degree that is between 3 and 20. The surfactants used herein are fully soluble in both water and LPG. As discussed below, the preferred method(s) involve(s) not adding water or gas to the formation.

As discussed elsewhere herein, the LPG functions as a delivery system for the surfactants. Preferably, the LPG transports the surfactants to parts of the formation containing water, including the fractures and the matrix, where the surfactants preferentially partition into the water. Once partitioned in the water, the surfactants lower the surface tension of the water and also reduce the interfacial tension between the water and any residual hydrocarbons, i.e., oil. If the formation rock is water-wet, then the surfactant will help release the water from the rock and change the wettability of the rock so that the oil can more freely flow out of the formation. Preferably, at least some of the surfactant(s) will not partition over to the water, and that portion preferably remains dissolved in the LPG. Advantageously, the surfactant that remains dissolved in the LPG may be helpful in cases where the LPG encounters oil wet rock as the surfactant may aid in releasing the oil from the rock. This is another benefit of using surfactants that are both water-soluble and LPG-soluble.

The term "polyester" as used herein is defined as a polymer that contains an ester functional group in every repeat unit of the main chain. One type of polyester is polyethylene terephthalate (PET).

The term "non-emulsifier" as used herein is defined as any compound that inhibits or prevents the formation of an emulsion. Any non-emulsifier used in any of the treatment methods herein is preferably a cationic surfactant or a non-ionic polyester, used either alone or in combination as a mixture, which may exist as a solution depending on their solubilities. Preferably the cationic surfactant that can be used as a non-emulsifier in the methods herein is a tetra-substituted ammonium salt in which one or more of the alkyl substituents is a fatty or fatty derivative moiety. Preferably, the non-ionic polyester that can be used as a non-emulsifier is any one or more condensation product(s) obtained from one or more fatty acids derivative(s).

As discussed in greater detail herein, any non-emulsifier used in the treatment methods herein preferably has a tendency to stay at any oil-water interface, reduce the interfacial tension between the oil and water, and prevent or inhibit the water and oil from mixing to a point where an emulsion would form. Thus, in a preferred embodiment, there is the lack of any emulsion (no emulsion), or at least there is essentially no emulsion, i.e., not an amount of emulsion that would substantially interfere with the movement of the composition (preferably including LPG, surfactant, oil, water, non-emulsifier and defoamer) being removed from the fractures and matrix en route to the wellbore. Preferably, the water (and/or any aqueous solution that is part of the composition being removed) and oil (and/or any oil phase that is a mixture of residual oil and LPG that is part of the composition being removed) exist in separate phases so that they can each more easily flow back toward the wellbore. The viscosity of the oil phase is preferably lower than the viscosity of the residual oil itself, that is being removed from the fractures and also preferably from the matrix.

The term "defoamer" as used herein is defined as any compound that inhibits or prevents the formation of foam in the composition being removed from the fractures, preferably resulting in either no foam at all in that composition or essentially no foam. One or more preferred embodiments of the methods and systems disclosed herein include the use of an "alcohol-based defoamer," a term that, as used herein, is defined as any defoamer that is or includes, or is derived from an alcohol. For example, the treatment composition may include isopropyl alcohol in an amount that is from a low of about 0.01 vol %, 0.02 vol % or 0.03 vol % of the treatment composition to a high of about 0.5 vol %, or 0.8 vol % or 1.0 vol % of the treatment composition. When used in any of the methods or systems disclosed herein, the defoamer, particularly an alcohol-based defoamer, preferably stays fully dissolved in the LPG-containing portion of the composition being removed, as part of the same phase. In that capacity the alcohol tends to prevent, inhibit, or discourage some or all of the surfactant remaining in the LPG-containing portion of the composition, which is preferably also part of the oil-phase, from creating a foam column during production flowback. It has been recognized by the inventors that the LPG has the potential of taking on a gaseous state when the composition is being removed from the matrix and fractures en route to the wellbore. Preferably, the defoamer is mixed with or dissolved in the LPG, so that they both flow back together toward the wellbore, which is when the LPG may tend to convert to a gaseous state. Foam may have the tendency to block parts of the fractures and matrix, so by preventing or minimizing the presence of foam, there is a greater likelihood of a sufficiently good flow path through the fractures and preferably the matrix, which has an end-result of increasing overall production.

The term "non-emulsifying solubility agent" as used herein is defined as solubility agent that inhibits or prevents the formation of an emulsion.

The term "soluble" as used herein is an adjective that, as used herein is defined as the description of a material capable of being fully or partially dissolved into another material. The term "partially soluble" refers to a material, e.g., certain LPG-based treatment compositions disclosed herein, that are capable of being partially but not fully dissolved in another substance, e.g., water, in which case the treatment composition is more specifically "partially soluble in water." In that example, a portion of the LPG becomes part of the water phase leaving another portion of the LPG that is not part of the water phase, thus providing a multiphase mixture. The term "solubility" as used herein is the noun form of the word soluble, and characterizes any soluble material, preferably in quantified terms and more preferably in measurable terms. In one or more specific embodiments, the quantified solubility of a material, e.g., a treatment composition in water, is preferably measured pursuant to the following procedure:

1. Dose the portion of a composition into the receiving fluid at the prescribed levels of treatment ranges
2. Observe the sample for clarity, separation, and deposition over a period of 48 hours at room temperature and atmospheric pressure (using Pentane in place of LPG)—at the prescribed treatment ranges listed herein Miscibility refers to the property of substances that when mixed together in any proportion form a homogeneous solution. The term "miscible" as used herein is an adjective that, as used herein, is defined as the description of a material that is capable of being mixed together in any proportion to form a homogeneous solution. As used herein, the term miscible is used to describe any material that is miscible, e.g., surfactant(s), with another material when the two materials are mixed together in any proportion to form a homogeneous solution, e.g., the LPG. In certain embodiments a miscible material is also soluble and is capable of being fully or partially dissolved in the other substance which prevents separation at least to the extent the material and substance form a single-phase solution. The term "partially miscible" as used herein is defined as the description of a material that is capable of being mixed with another substance, e.g., dissolving into that other substance, without separating fully, but resulting in at least some degree of separation. The term "partially miscible in the LPG" as used herein is defined as the description of a material, e.g., surfactant(s), that is/are capable of being mixed with LPG, e.g., dissolving into that LPG, without separating fully but resulting in at least some degree of separation. The term "miscibility" as used herein is the noun form of the word miscible. Miscibility can be measured in a laboratory under specific conditions of pressure and temperature. Laboratory results can then be modeled with an equation of state for estimation of miscibility under a variety of pressure and temperature conditions for application in field operations. Additionally, in certain contexts the term "miscibility" as used herein may also describe the recovery mechanism of residual oil when contacted by the LPG. The residual oil swells as it absorbs the LPG, reducing its viscosity and increasing its ability to flow toward the wellbore.

The terms "ball diverters" and "diverter balls" as used herein is defined as any solid object that is or can be pumped into a wellbore and is capable of blocking and preferably sealing any perforation in the casing and/or other production tubular. A ball diverter is preferably spherical or substantially spherical, and is preferably solid or partially solid (e.g., possibly being porous or having open spaces within). As used herein, a ball diverter includes any solid object that persons in the oil or gas industry have referred to or defined as "diverters" or "frac balls" or "ball sealers."

The terms "fracture zone" and "fracture system" as used herein are defined as any portion of a subterranean formation that includes one or more hydraulic fractures held open by proppant(s), which may include sand or artificial proppants (having varying mesh sizes). A fracture system may be connected to a matrix by "induced unpropped microfractures" (IUs) which may tend to close rapidly when formation pressure declines. IUs may play a significant role in dispersing and trapping water used in initial hydraulic fracturing treatments.

The term "stimulated rock volume (SRV)" as used herein is defined as an induced network of hydraulic fractures and reopened natural fractures for a specified formation or part of a formation. The SRV can be quantified using as an estimate micro-seismic measurements. Discussions on how to estimate SRV is included in the article entitled "Calculating SRV with consideration of Uncertainties in Micro-seismic-Event Locations. (Ulrich Zimmer, Shell Oil USA) DOA 10.2118/148610-MS January 2011. In many cases, micro-seismic measurements are taken during the hydraulic fracturing operation and those measurements can help indicate key fracture properties including azimuth, height, length, affected reservoir volume and complexity of the induced fractures. During the application of the micro-seismic tests, if opening of the induced unpropped microfractures (IU's) are detected, then those IU's are also preferably included as part of a well's initial SRV. An SRV that is estimated after a prolonged production period is sometimes referred to as "effective SRV" at that point in time. In general, effective SRV is a quantity that can be determined by any of a number of reservoir simulation methods, each of which rely on various measurements and calculations. There is no restriction herein on which method or equipment is used to determine effective SRV. Rather, in the context of the treatment methods disclosed herein the difference is what counts, and thus the important thing is to use the same method before and after the treatment method so that the difference (preferably an increase) can be accurately determined. All references to SRV include effective SRV, and persons skilled in the art of reservoir stimulation or oil and gas production may also refer to stimulated rock volume or SRV using the term "stimulated reservoir volume,"

The term "estimated pre-treatment stimulated rock volume (SRV)" as used herein is defined as a quantity associated with a particular effective SRV for a particular part of a reservoir, e.g., a fracture system for a particular well, arrived at by any estimation technique, before any of the treatment methods are applied to that part of the reservoir.

The term "formation pressure" as used herein is defined as the pressure of fluids that exists within the pores of any selected part of a reservoir. Formation pressure is sometimes also referred to by persons skilled in the art of oil and gas production and well stimulation as "pore pressure" or "reservoir pressure." See the Online Schlumberger Oilfield Glossary. A selected part of a reservoir is preferably any part of a reservoir that is being subjected to any of the treatment methods disclosed herein at the point in time when the treatment composition is first pumped into the wellbore as part of any of the treatment methods disclosed herein. For example, the formation pressure for a particular well is often different at the point in time the well is being subjected to any of the treatment methods disclosed herein than when the production for that well is initially begun, e.g., after hydraulic fracturing, which is sometimes referred to as "initial formation pressure." One selected part of a reservoir that is used as part of the methods disclosed herein is the "matrix" which is defined herein as the part of the formation surrounding the wellbore and extending radially from the outer walls of the casing to any part of the formation and which is in communication with the wellbore either directly or via a previously formed hydraulic fracture.

The term "fracture pressure" as used herein is defined as the pressure within a selected part of a reservoir, preferably the "matrix" as defined herein, above which the injection of fluids would cause that part of the reservoir to fracture hydraulically. See the Online Schlumberger Oilfield Glossary.

The term "formation fluid" as used herein is defined as any fluid residing in any of the pores of any part of a reservoir, preferably any of the pores of the matrix that is being treated by any of the treatment methods disclosed herein. As used herein, a formation fluid can include hydrocarbons such as oil or gas, and can also include water, including formation water, sometimes called connate water, as well as residual fracture water, which is any water that was previously pumped into or otherwise introduced to the reservoir during a hydraulic fracturing operation. A formation fluid can also include any residual fracturing chemicals left over from a previous fracturing operation.

The term "water" as used herein refers to any substance commonly referred to as "water" and not in its liquid form but also in vapor or gaseous form. In certain contexts, the term "water" may refer to water that is mixed with other liquids or solid materials or chemicals, although such a mixture or aqueous solution that includes the water will more typically be referred to herein as a "solution," "mixture," or "composition" with the water as a component or precursor. Unless otherwise specified, the term "water" may refer to any of the various specific types of water associated with a well including fracture water, formation water, connate water, post-production treatment water, and residual water.

The term "fracture water" as used herein is defined as water that was pumped into the wellbore of a particular well as part of a previous hydraulic fracturing operation and was not removed as part of any subsequent production efforts or at any time prior to the initiation of any of the treatment methods described herein. The fracture water may reside in any of a number of places below the earth surface including in the wellbore itself, in one of the fractures, whether a hydraulic fracture or a natural fracture that existed in the formation before any hydraulic fracturing, or in the rock matrix somewhere, such as in one of the pores. After removal from the fracture system or matrix following or as part of any of the treatment methods herein, the fracture water may still be referred to as fracture water even though it is no longer residing in the fracture.

The term "formation water" as used herein refers to any water residing in the formation before the initiation of any of the treatment methods described herein and may be water residing in one of the fractures or water residing in the rock matrix (e.g., in a pore) before application of any of the treatment methods described herein. As used herein, formation water and fracture water are different, even if both of them may co-exist in the same reservoir, for example. "Connate water" as the term is used herein refers to a particular type of formation water that is found residing in the pores of a particular formation when that formation is first subjected to oil and gas operations. After removal from the formation following or as part of any of the treatment methods herein, the formation water may still be referred to as formation water even though it is no longer residing in the formation.

The term "residual water" as used herein is defined as any water that resides in a wellbore or a formation associated with that wellbore (including the rock matrix and fractures surrounding the wellbore) after a hydraulic fracturing operation and any subsequent production up to the point where any of the treatment methods are initiated, including fracture water and formation water.

The term "post-production treatment water" as used herein is defined as any water that resides in a wellbore or a formation associated with that wellbore (including the rock matrix and fractures surrounding the wellbore) after a post-production treatment operation such as but not limited to a wellbore cleanout and any subsequent production up to the point where any of the treatment methods are initiated, and such post-production water may include fracture water and formation water.

The term "lubricant" as used herein is defined as any substance that is part of a treatment composition that includes LPG that increases the capacity of the LPG to move into and through the formation, including through fractures and preferably also parts of the matrix, while minimizing any increase in pressure.

The terms cross-linker or breaker as used herein are defined as any compound that reacts with a lubricant to form a gel, and the gel may have any viscosity within a range of 2 cp, or 3 cp, or 4 cp, or 5 cp to 500 cp, or 600 cp, or 700 cp, or 800 cp, or 900 cp, to contribute to diversion of the treatment composition, e.g., directing of treatment composition preferentially to one or more clusters of perforations over other perforations.

3. Certain Specific Embodiments

Now, certain specific embodiments are described below, which are by no means an exclusive description of the inventions. Other specific embodiments, including those referenced in the drawings, are encompassed by this application, and any patent that issues therefrom.

Disclosed herein are methods, compositions, and systems for treating a hydrocarbon-bearing formation previously subjected to hydraulic fracturing.

Disclosed herein are methods, systems, and compositions for treating hydrocarbon-bearing formation previously subjected to hydraulic fracturing. One or more of the methods comprise (include) pumping into the wellbore a treatment composition comprising LPG combined with one or more surfactants each of which is fully or partially dissolved into the LPG, and the treatment compositions may also include a non-emulsifier that is fully or partially dissolved into the LPG and a defoamer that is fully or partially dissolved into the LPG. One or more of those methods may also include causing the treatment composition to make contact with water residing in the formation, preferably such that at least most of the one or more surfactants partitions into the water. One or more of the methods may also include recovering a composition that includes residual hydrocarbons and at least some of the LPG and water that resided in the formation and at least some of the one or more surfactants that were pumped into the wellbore.

One or more of the methods for treating hydrocarbon-bearing formations previously subjected to hydraulic fracturing may include, alternatively, or in addition: (a) pumping into the wellbore a first volume of treatment composition comprising LPG; (b) pumping into the wellbore a second volume of treatment composition comprising LPG and a diverter; (c) pumping into the wellbore a third volume of treatment composition comprising LPG; and (d) recovering hydrocarbons and water previously residing in the formation, and at least a portion of the LPG previously pumped into the wellbore.

One or more of the methods may additionally include causing the treatment composition to make contact with water residing in the formation such that over half of the amount of the one or more surfactants partitions into the water.

One or more of the methods may additionally include recovering a composition from the formation that includes residual hydrocarbons and at least some of the LPG and surfactant(s) that were pumped into the wellbore and water that resided in the formation, wherein the residual hydrocarbons and LPG in the composition that is being recovered are in a non-emulsified or substantially non-emulsified form.

In one or more of the methods, the treatment composition may include an alcohol-based defoamer.

In one or more of the methods disclosed herein, the treatment composition that is pumped into the wellbore includes no separately added water or gas.

One or more of the methods disclosed herein additionally includes monitoring the wellhead pressure while pumping a first volume of treatment composition and altering the first volume based on the pressure reaching a first predetermined level before pumping a second treatment volume.

One or more of the methods additionally includes monitoring the wellhead pressure while pumping a third volume of treatment composition and altering the third volume based on the pressure reaching a second predetermined level before pumping a fourth treatment volume.

In one or more of the methods disclosed herein the pressure within the wellbore region is maintained above the induced unpropped microfracture (IU) re-entry pressure and below the fracture pressure.

One or more of the methods disclosed herein additionally includes determining a fracture zone treatment volume which may include estimating the pre-treatment stimulated rock volume (SRV) of one or more selected fracture zones.

In one or more of the methods disclosed herein, the fracture zone treatment volume is an estimated pre-treatment stimulated rock volume (SRV) of the one or more selected fracture zones and the volume of treatment composition is greater than the estimated pre-treatment stimulated rock volume (SRV) of the one or more selected fracture zones.

In one or more of the methods the formation has a fracture pressure and the volume of the treatment composition comprising LPG is injected at a pressure below the fracture pressure of the formation and the method includes recovering at least a portion of the treatment composition.

In one or more of the methods disclosed herein, at least one of the surfactants is a linear or branched fatty alcohol preferably having an ethoxylation degree that is between 3 and 20.

In one or more of the methods disclosed herein each of the one or more surfactants is fully soluble in both water and LPG, preferably at the treatment levels described herein.

In one or more of the methods disclosed herein the treatment composition includes a non-emulsifier comprising a tetra-substituted ammonium salt having one or more of the alkyl substituents that is a fatty or fatty derivative moiety, alone or in combination with a non-ionic polyester that is a condensation product obtained from one or more fatty acids derivatives.

In one of more of the methods disclosed herein the treatment composition includes a defoamer that stays fully dissolved in the LPG-containing portion of the composition being removed.

In one or more of the methods portions of treatment composition can be pumped separately into the wellbore in three or more pumping stages.

One or more of the methods disclosed herein includes a first pumping stage which comprises pumping a first volume of LPG in liquid form with essentially no diverter balls or chemical diverter followed by a second pumping stage which comprises pumping a second volume of LPG in liquid form along with diverter balls or a chemical diverter, wherein the first volume is greater than the second volume.

One or more of the methods additionally includes causing the treatment composition to make contact with water residing in the formation such that the non-emulsifier migrates from the LPG to the oil-water interface between LPG and residual water and between residual oil and residual water, thus maintaining a two-phase system during treatment and during flowback.

In one or more of the methods the treatment composition includes a defoamer that remains in the LPG and thus reduces the foaming potential in the LPG coming back during flowback.

In one or more of the methods the treatment composition includes a surfactant that while preferentially partitioning to the water phase during treatment will not 100% partition to the water phase. In that specific embodiment while most of the surfactant partitions into the water phase, a not insignificant amount of the surfactant stays in the LPG, which surprisingly provides a benefit that the composition is able to alter the wettability of the formation from either water-wet to oil-wet, or oil-wet to waterwet, depending upon the pre-treatment state of the well, as described herein.

One or more methods disclosed herein includes treating a hydrocarbon-bearing formation previously subjected to hydraulic fracturing which may comprise: (a) pumping into the wellbore a treatment composition comprising LPG uniquely combined with one or more surfactants that each of which is fully or partially dissolved into the LPG, a non-emulsifier that is fully or partially dissolved into the LPG, and a defoamer that is fully or partially dissolved into the LPG; (b) causing the treatment composition to make contact with water residing in the formation such that at least a majority of one or more surfactants partitions into the water; and (c) recovering a composition that includes residual hydrocarbons and at least some of the LPG and water that resided in the formation and at least some of the one or more surfactants that were pumped into the wellbore, which flows back in a non-emulsified two-phase system with emulsions and foaming minimized to allow for more effective flowback. In certain embodiments, the water that is recovered is fracture water, and in other embodiments the water is a mixture of fracture water and formation water. Preferably, the composition that is removed is not a foam nor is it emulsified, and the composition is preferably a multi-phase composition that includes an aqueous phase that includes fracture water and a hydrocarbon phase that includes at least some of the LPG from the treatment composition that was pumped into the wellbore and hydrocarbons including oil from the formation.

Disclosed herein are methods for treating a hydrocarbon-bearing formation previously subjected to hydraulic fracturing comprising: (a) pumping into the wellbore a treatment composition comprising LPG and a non-emulsifying alcohol ethoxylate surfactant; and then (b) recovering a composition that includes hydrocarbons that resided in the formation prior to the pumping of the treatment composition into the wellbore and water. In certain embodiments, the water that is recovered is fracture water, and in other embodiments the water is a mixture of fracture water and formation water. Preferably, the composition that is removed is not a foam nor is it emulsified, and the composition is preferably a multi-phase composition that includes an aqueous phase that includes fracture water and a hydrocarbon phase that includes at least some of the LPG from the treatment composition that was pumped into the wellbore and hydrocarbons including oil from the formation.

In one or more of the disclosed methods, the treatment composition comprises a polyester non-emulsifier.

Disclosed herein are methods for treating a hydrocarbon-bearing formation previously subjected to hydraulic fracturing comprising: (a) pumping into the wellbore a treatment composition comprising LPG and having a non-emulsifying solubility agent in an amount sufficient to cause the treatment composition to be partially soluble in water and partially miscible in the LPG; and then (b) recovering hydrocarbons and water previously residing in the formation, and at least a portion of the LPG previously pumped into the wellbore.

In one or more of the methods, the treatment composition comprising LPG and surfactant(s) can be pumped into a wellbore, and the solubility of the surfactant(s) in water can be greater than the solubility of the surfactant(s) in LPG.

In one or more of the methods, the solubility agent includes an alcohol ethoxylate surfactant.

In one or more of the methods, the solubility agent includes a polyester non-emulsifier.

In one or more of the methods, the solubility agent includes an alcohol-based defoamer.

Disclosed herein are methods for treating a hydrocarbon-bearing formation previously subjected to hydraulic fracturing comprising of diversion stages between treatment intervals for the purpose of increasing eSRV by: (a) pumping into the wellbore a first volume of treatment composition comprising LPG; (b) pumping into the wellbore a second volume of treatment composition comprising LPG and ball type diverters and/or chemical diverter; (c) pumping into the wellbore a third volume of treatment composition comprising LPG, and (d) recovering hydrocarbons and water previously residing in the formation, and at least a portion of the LPG previously pumped into the wellbore.

One or more of the methods additionally includes monitoring the wellhead pressure while pumping the first volume of treatment composition and altering the first volume based on the pressure reaching a first predetermined level before pumping the second treatment volume, which is the first diverter stage.

One or more of the methods additionally includes monitoring the wellhead pressure while pumping the third volume of treatment composition and altering the third volume based on the pressure reaching a second predetermined level before pumping the fourth treatment volume, which is the second diverter stage.

In one or more of the methods, the pressure within the wellbore region is maintained above the induced unpropped microfracture (IU) re-entry pressure and below the fracture pressure.

Disclosed herein are methods for treating a hydrocarbon-bearing formation previously subjected to hydraulic fracturing comprising: (a) determining a fracture zone treatment volume for one or more selected fracture zones extending from the wellbore into the reservoir formation surrounding the wellbore; (b) injecting a volume of treatment composition comprising LPG into the one or more selected fracture zones, wherein the volume of treatment composition is derived from the fracture zone treatment volume, and (c) recovering at least a portion of the treatment composition from the wellbore.

In one or more of the methods at least one of the surfactants is a linear or branched fatty alcohol.

In one or more of the methods the treatment composition includes a non-emulsifier comprising polyethylene terephthalate.

In one or more of the methods, the treatment composition includes a non-emulsifier comprising a cationic surfactant, alone or in combination with a non-ionic polyester.

In one or more of the methods, the treatment composition includes a non-emulsifier comprising a non-ionic polyester, alone or in combination with a cationic surfactant.

In one or more of the methods the treatment composition includes a non-emulsifier comprising a non-ionic polyester that is a condensation product obtained from one or more fatty acids derivatives.

In one or more of the methods the viscosity of the oil phase is lower than the viscosity of the residual oil being removed.

In one or more of the methods the treatment composition includes a defoamer that includes isopropyl alcohol.

In one or more of the methods the treatment composition includes a defoamer that includes isopropyl alcohol in an amount of from 1 vol % to 10 vol % of the treatment composition.

In one or more of the methods the well's effective stimulated rock volume (eSRV) is increased by a factor of 1.2 or greater following steps (a), (b) and (c).

In one or more of the methods the treatment composition is pumped into the wellbore in three or more pumping stages.

In one or more of the methods the second volume stage comprises a physical diversion material that breaks down or dissolves in the production fluids at flowing bottom hole temperatures.

4. Additional Specific Embodiments and Descriptions

The drawings presented herein are for illustrative purposes only and are not intended to limit the scope of the claims. Rather, the drawings are intended to help enable one having ordinary skill in the art to make and use the claimed inventions.

Referring to FIGS. 1-7, various aspects of methods, compositions, and systems are illustrated. These methods include steps any one of which may be found in various specific embodiments, including both those that are shown in this specification and those that are not shown. The compositions include any of the compositions disclosed herein, including the treatment compositions that include LPG.

Included in the methods, compositions, and systems disclosed below are methods and systems for treating, e.g., stimulating, oil and/or gas production wells that have previously been completed, preferably in tight conventional and unconventional (shale and/or tight sand) reservoirs utilizing treatment compositions comprising liquid petroleum gas (LPG). preferably treatment compositions that are more than 50%, or 70%, or 90% by volume C3s and C4s (propane and butanes). As described elsewhere herein, the treatment compositions can be pumped into the existing production wells for the purposes of increasing the production rate and increasing the total amount of recovery of oil and gas.

Although the treatment composition, also referred to sometimes herein as a stimulation fluid, is preferably mostly C3 (propane) and C4 (butane & iso-butane) by volume, it may also include LPG components ranging from C2 (ethane) through to C5+(pentane and longer hydrocarbons). LPG useful in the methods described herein can often be purchased from regional gas plants. At least one of the objectives of one or more specific embodiments of the methods and systems is to increase the well's effective stimulated rock volume (eSRV) by a factor of 1.2 or greater. Because the treatment composition is in a liquid phase and relatively low pressure is necessary to pump the composition (preferably all liquid no gas) into the wellbore, i.e., the internal space within the central portion of the wellbore, treatment methods described herein can be accomplished with any conventional pumping system, preferably a mobile pumping system that is capable of pumping the treatment compositions described herein, and that includes metered mixing tanks for combining different components of the treatment composition as illustrated in FIG. 1. Preferably, the LPG that is to be used as part of the treatment composition is loaded from tanker trucks to mobile storage tanks 106 placed on the well site location and the LPG is maintained in the mobile storage tanks 106 at approximately 200 psi, but the LPG storage pressure can range more broadly from 175 psi to 350 psi. Chemicals are added upstream of the pumps 108. The treatment composition is preferably pumped 109 through a wellhead 104 in stages at flow rates of from 5 to 15 barrels per minute, e.g., and preferably at nominal rates within that range and up to 20 barrels per minute with a wellhead pressure ranging from 1000 to 4000 psi, and preferably a nominal wellhead pressure within that range of up to 5000 psi. A control van 110 may be parked near the wellhead 104 to communicate with sensor systems in the wellhead 104. The control van 110 may collect data, e.g., wirelessly, from the wellhead 104. The data may include wellhead pressures, pump pressures, pump rates (barrels per minute), etc.

Preferably, performing any of the treatment methods disclosed herein results in: 1) opening up blocked intervals in the wellbore and/or near wellbore region, 2) delivering the LPG into the fracture systems to swell and mobilize the oil at the fracture wall/matrix interface, 3) adding energy in the form of pressure to the fracture system and pushing the leading edge of the treatment composition, particularly the LPG, surfactant(s), and non-emulsifier(s), farther into the rock matrix, 4) contacting with the treatment composition trapped water that is blocking the matrix, in order to mobilize water (including fracture water and formation water) and restore the rock's relative permeability to oil, and 5) contacting with the treatment composition, particularly the LPG and surfactant(s), trapped water and residual oil that is blocking the matrix, reducing the interfacial tension between the trapped water and oil, in order to mobilize said water (including fracture water and formation water) and oil and improve the ability of the water and oil to move to the wellbore and be produced from the well.

In this respect, the water in the fractures and matrix is preferably mobilized via contact with the LPG and surfactant(s) that is/are both partially soluble in water and partially miscible in the reservoir hydrocarbons that reside trapped by the fracture water in the fractures. Preferably, the oil in the matrix, i.e., residual hydrocarbons, absorbs the LPG resulting in a swelling of the oil, and a reduction in viscosity of the mobilized residual oil. As the oil increases in volume, it is drawn out of the matrix and is then free to flow through the fractures (which are preferably propped via proppants that are still in place from the hydraulic fracturing operation) and then to the wellbore through perforations. As LPG continues to move into the matrix and contact more oil molecules, those oil molecules swell and the oil continues to move out of the matrix into the fracture system and then into the wellbore. Preferably, the treatment composition pumped into the wellbore as part of the treatment method contains substantially no separately-added water, i.e., there may be trace amounts of water included in some of the additive components, but that is not considered "separately-added water" for purposes herein. Preferably as little water as possible is present in the treatment composition. Preferably, the treatment composition is free of emulsions or foaming agents as both will tend to inhibit the leading edge of the LPG from reaching the matrix and will also tend to impede the ability of oil and water to flow into the wellbore from the wellbore region.

Typically, the SRV for a particular well is greatest immediately after the well is hydraulically fractured and it then declines over time as the well produces. This decline is due to number of factors, including precipitates or sand or artificial proppant deposition in the wellbore and/or near wellbore fracture region, closure of propped fractures or induced unpropped micro fractures (IUs) due to pressure depletion or proppant/matrix deformation, and relative permeability impacts in the near wellbore region due to gas breakout, liquid dropout, or trapped water movement. In a fractured horizontal well, without any downhole monitoring to determine where the flow is actually coming from, it is often very difficult to determine what part of the decline of the well is attributed to any of the various factors, such as wellbore blockage, precipitate deposition in the pore space of the fracture, movement of the proppant itself, fracture closure, etc. Accordingly, one of the objectives of the methods disclosed herein is to re-connect the wellbore to propped fractures and re-connect propped fractures to the formation matrix, in order to re-establish flow pathways from the matrix to the wellbore.

Determining the total volume of treatment composition pumped into the wellbore for a particular well, and whether the treatment composition is pumped continuously or intermittently depends on a number of factors. In one or more embodiments of the methods and systems, the treatment composition is pumped continuously until the entire volume has been pumped into the wellbore, as discussed below in greater detail, after which, the fluids in the wellbore (liquids as well as gases) are removed, i.e., recovered. In those methods, the total volume of the treatment composition containing LPG selected to be used in the treatment method for a particular well is based on the entire eSRV for that well, as derived from a reservoir simulation, along with the estimated pore volume of the existing fracture system for that well which is designed so that a proper volume of treatment composition contacts a desired portion of the reservoir matrix along the entire wellbore.

In one or more other embodiments of the methods and systems, the treatment composition is pumped into the wellbore intermittently, as discussed below in greater detail.

In one embodiment the stimulant may start out as pure C3, pure C4, or a predefined mixture of C3 and C4 designed to be compatible with chemical additives 108, particularly the surfactant(s), as discussed below.

In one or more specific embodiments of the methods and systems, the LPG includes unfractionated hydrocarbon mixtures commonly referred to as Y-grade. Preferably, the LPG is a pumpable liquid at surface temperature and at the pressure conditions of the storage vessels where the LPG is stored.

In one or more specific embodiments of the methods and systems, the treatment composition that comprises LPG is pumped into the wellbore in a single pumping stage, i.e., made up of continuously pumping a liquid treatment composition into the well until a decision is made to stop pumping wherein the decision is preferably predicated on a recognition or assumption that sufficient liquid treatment composition has been introduced to the well so as to occupy a sufficient number of fractures. That recognition of assumption can be based on pressure measurements including pressure measurements described elsewhere herein.

In preferred embodiments the treatment methods include multiple pumping stages, preferably intermittent stages wherein a first pumping stage comprises pumping a liquid-only treatment composition that includes LPG and preferably one or more other components such as those described elsewhere herein such as surfactant(s), non-emulsifiers, and defoamers, and a second pumping stage comprises pumping a liquid that includes not only LPG and the other components described in the previous sentence, but also a diverter agent, such as diverter balls or a chemical diverter. Preferably, the first and second stages are performed alternately, e.g., a first pumping stage followed by a second pumping stage, followed by another first pumping stage and a second pumping stage, etc.

Preferably, the first pumping stage is a large-volume pumping stage, i.e., pumping a larger volume of treatment composition than the volume of treatment composition in the second pumping stage, which includes the diverter. As described in greater detail below, in an intermittent (also referred to as alternating) pumping version of the method, one of the purposes of the second pumping stage, which includes pumping a diverter agent, e.g., diverter balls, into the wellbore is to direct the treatment composition into fractures that have the most residual hydrocarbons, e.g., trapped oil, and away from where it might naturally otherwise go, e.g., the path of least resistance, which is fractures that are more likely to have fewer residual hydrocarbons. At least one of the objectives of the intermittent pumping version of the method is to maximize the number of fractures contacted with the treatment composition, and to also maximize the volume of treatment composition in each fracture.

Preferably, each pumping stage will affect a group of fracture stages 202a-c. A fracture stage 202a (also referred to sometimes as a "frac stage") is a pre-defined section 204 of the wellbore that is perforated and through which fracturing fluid, proppant, and chemicals passed during hydraulic fracturing, resulting in a network of hydraulic fractures, illustrated in FIG. 2A. In one or more preferred embodiments, e.g., preferred versions of the method and system, multiple quantities (sometimes referred to as volumes or "slugs") of treatment composition comprising LPG and the other components including the surfactant(s) are pumped into a horizontal wellbore that has from 10 to 50 frac stages with an illustrative length of each stage being from 200 to 400 feet, although the distance can be greater or less depending on the type of completion. Each frac stage 202 contains up to 10-20 clusters of perforations 206. Each cluster contains 3-15 individual perforations 206 in the casing 102 distributed over an interval of about 1-5 feet. An illustrative distance between each of the clusters is about 30 feet, although the distance can be greater or less depending on the type of completion.

In one or more embodiments the volume and number of pumping stages are predetermined based on well performance history with supporting data from reservoir simulation. In another embodiment, additional pumping stages may be added as part of the treatment of the well to re-establish flow in blocked perforation intervals based on the well's behavior during the treatment. Preferably, in practicing the treatment methods or systems disclosed herein, the volume of treatment composition pumped during a large-volume pumping stage, e.g., a "first" pumping stage discussed above, ranges from hundreds to thousands of barrels, while the volume of treatment composition pumped into the wellbore as part of the small-volume diversion pumping stage, is preferably no more than 20 barrels. In at least one specific embodiment of the method, the volume of treatment composition used in each pumping stage is determined based on immediate data feedback of treatment rates and pressure data acquired during the job. These data may be collected by taking measurements at the surface of the well using conventional pressure and flow rate equipment.

Figure 2A:
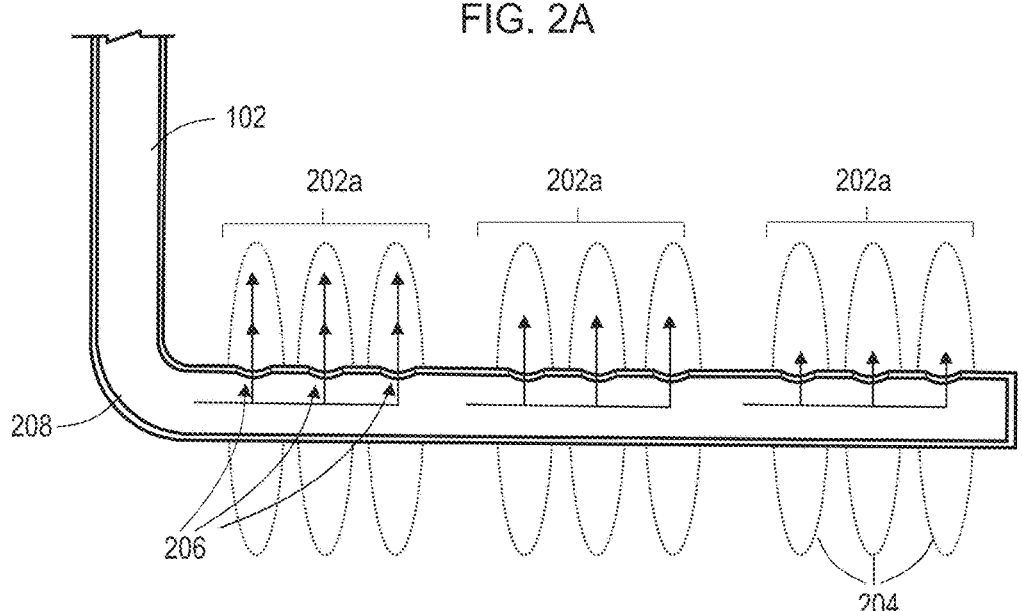
FIG. 2A depicts a wellbore with casing having multiple groups of perforations and treatment compositions passing through the perforations.
Figure 2B:
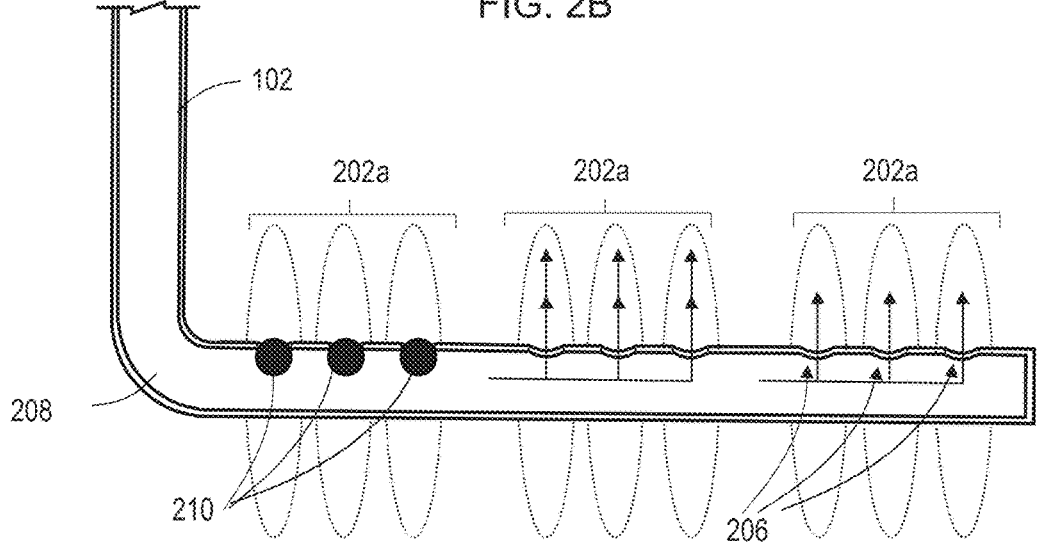
FIG. 2B depicts the wellbore configuration of FIG. 2A in which diverter balls are blocking one of the groups of perforations.
Figure 2C:
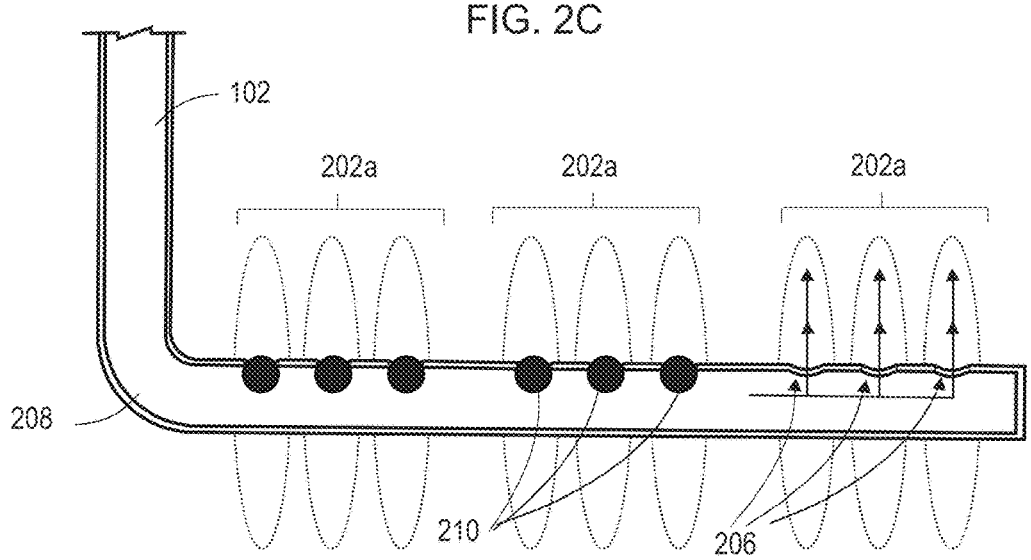
FIG. 2C depicts the wellbore configuration of FIG. 2A in which diverter balls are blocking two of the groups of perforations.

FIG. 2A demonstrates at least one of the preferred flow paths of the treatment composition into the path of least resistance at the "heel" 208 of the well during Stage 1, illustrating how in the absence of proper design of pumping protocols a significant portion of treatment composition will go where it will be less effective. In at least one specific embodiment of an intermittent pumping method, one or more smaller-volume pumping stages (a "second stage") is/are applied first to the wellbore, in order to block or seal selected perforations 206, and to direct to other perforations 206 corresponding to less permeable segments along the wellbore. When the diversion slug 210 starts to block the interval of dominant flow, the wellhead treatment pressure will tend to increase, and in a preferred embodiment, the method includes recording or otherwise identifying that wellhead pressure increase, which is an indication of effective diversion to a different wellbore interval. Once the desired volume of treatment composition has been pumped into the different wellbore interval, another diversion stage will be pumped, repeating the process. The volume of the treatment composition in the next pumping stage (referred to herein as a "first pumping stage") as well as the design of a subsequent diversion stage (referred to as a "second pumping stage") is preferably dependent on the pressure and flow rate of the treatment composition being pumped into the wellbore following the initial diversion slug 210. This use of pressure and flow rate is referred to herein as a "real-time feedback loop" illustrated in FIG. 3A and can continue to be used until all frac stages 202 are treated with treatment composition. In a preferred embodiment, reacting promptly and preferably in real-time to observed pressure and/or flow rate changes is helpful to ensuring all intervals are effectively opened as a result of the treatment described herein in order to increase production from the well, and preferably to maximize production. In at least one specific embodiment, coiled tubing is used to selectively isolate and stimulate specific wellbore sections in the place of diverters. In that embodiment, the treatment can be designed based on well performance history and reservoir simulation to pre-define the amount of treatment composition applied in each pumping stage.

In another embodiment, as an alternative to diversion, coil tubing may be used to pump the treatment compositions into isolated stage intervals using a type of inflatable packer system.

In another specific embodiment the treatment composition is pumped into the wellbore at nominal flow rates of up to 20 BPM (barrels per minute) and wellhead pressures of up to 5000 psi. Other rates and pressures may be used depending on formation characteristics and well designs. Preferably, the bottomhole treatment pressure throughout the wellbore exceeds the pressure required for the treatment composition to re-enter the IUs (referred to herein as "re-entry pressure") a value that can be derived from a geomechanical reservoir simulation. In at least one preferred embodiment of the method and system, the re-entry pressure is the pressure needed to re-open the IUs causing the IUs to dilate, and the bottom-hole pressure in the wellbore during pumping is preferably maintained above the re-entry pressure, which makes it more likely the treatment composition will reach certain parts of matrix. Generally speaking, when pressure depletion changes the rock stresses, the re-entry pressure becomes lower than the initial fracture parting pressure. Repeated dilation and compaction of the IUs preferably occurs during pumping operations of the treatment composition. It is contemplated that flow of fluid in the fracture system during the pumping phase and from the matrix to the fracture system upon turning the well back to production causes changes in earth stresses next to the fracture to form spalls on the fracture face, and those spalls may assist fractures to stay open. It is also contemplated that when there is repeated loading and unloading of stress in organic rich mud rocks, there is a greater likelihood of new flow paths via micro/nano cracks connected to the main fracture, thus leading to an improvement in effective permeability and effective SRV.

In one or more specific embodiments a treatment composition includes LPG, surfactant, flow-enhancer, paraffin inhibitor, and asphaltene inhibitor.

In one or more embodiments the treatment composition together with the overall volume as well as the volumes of the slugs, flow rates, pressures and stages are designed to maximize the volume of LPG and surfactant in the fractures and also to place the LPG and surfactant(s) in contact with the matrix that contains trapped frac water and residual oil. During the pumping of the treatment composition into the formation, the LPG preferably travels through the main propped fracture system, which tends to be the path of least resistance). While doing this the LPG preferably comes into contact with the surrounding matrix, including the part of the matrix that includes a surface that is an interface with the open part of the fracture. The matrix contains both residual oil and water, and the residual oil exists both on the rock surface that is the interface and also in certain pores within the matrix. When the LPG, which is miscible with residual oil, makes contact it induces swelling and reduced viscosity resulting in mobilization of residual oil all along the main propped fracture system and at the frac/matrix interface.

Figure 3A:
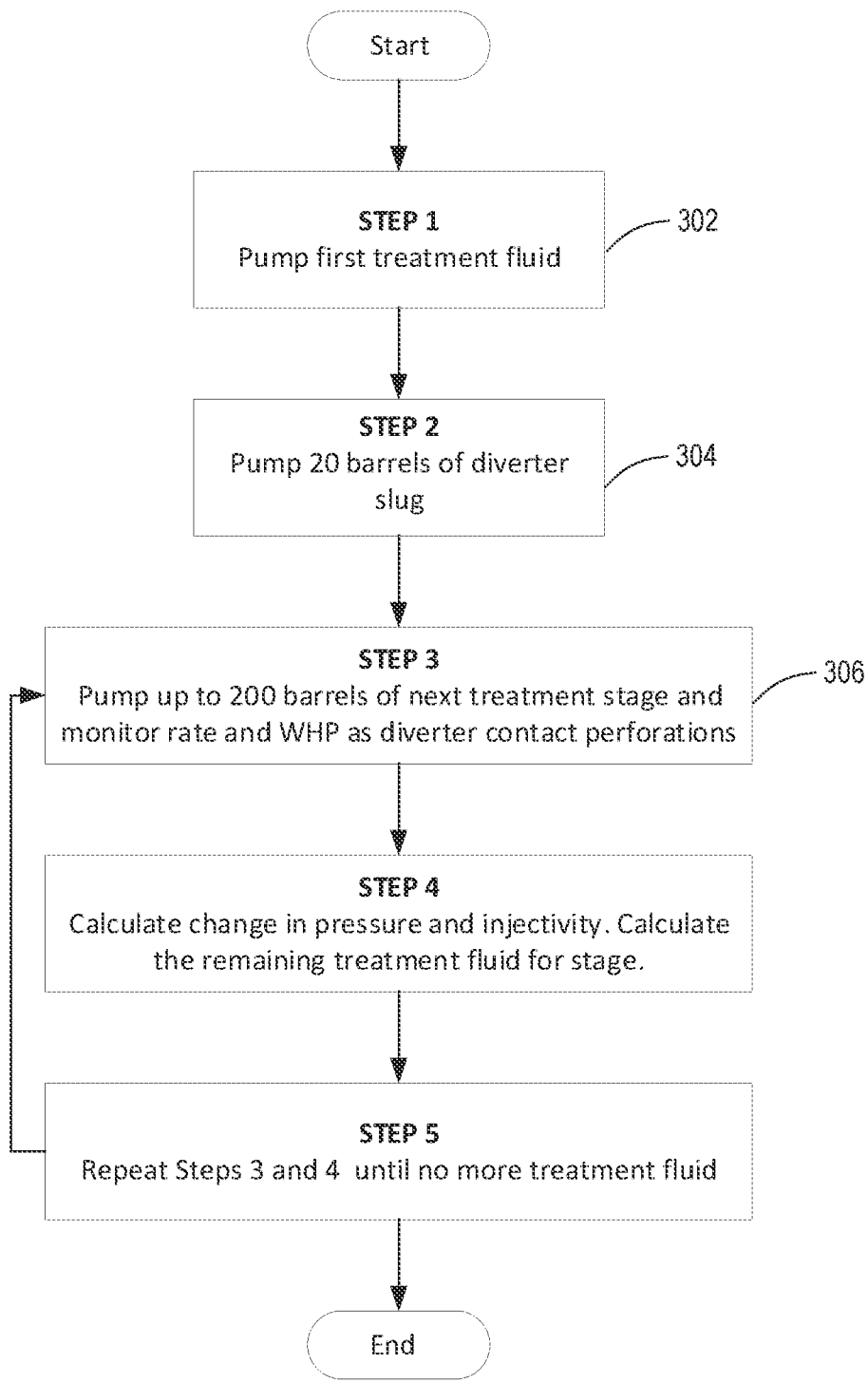
FIG. 3A is a flowchart depicting a treatment method.
Figure 3B:
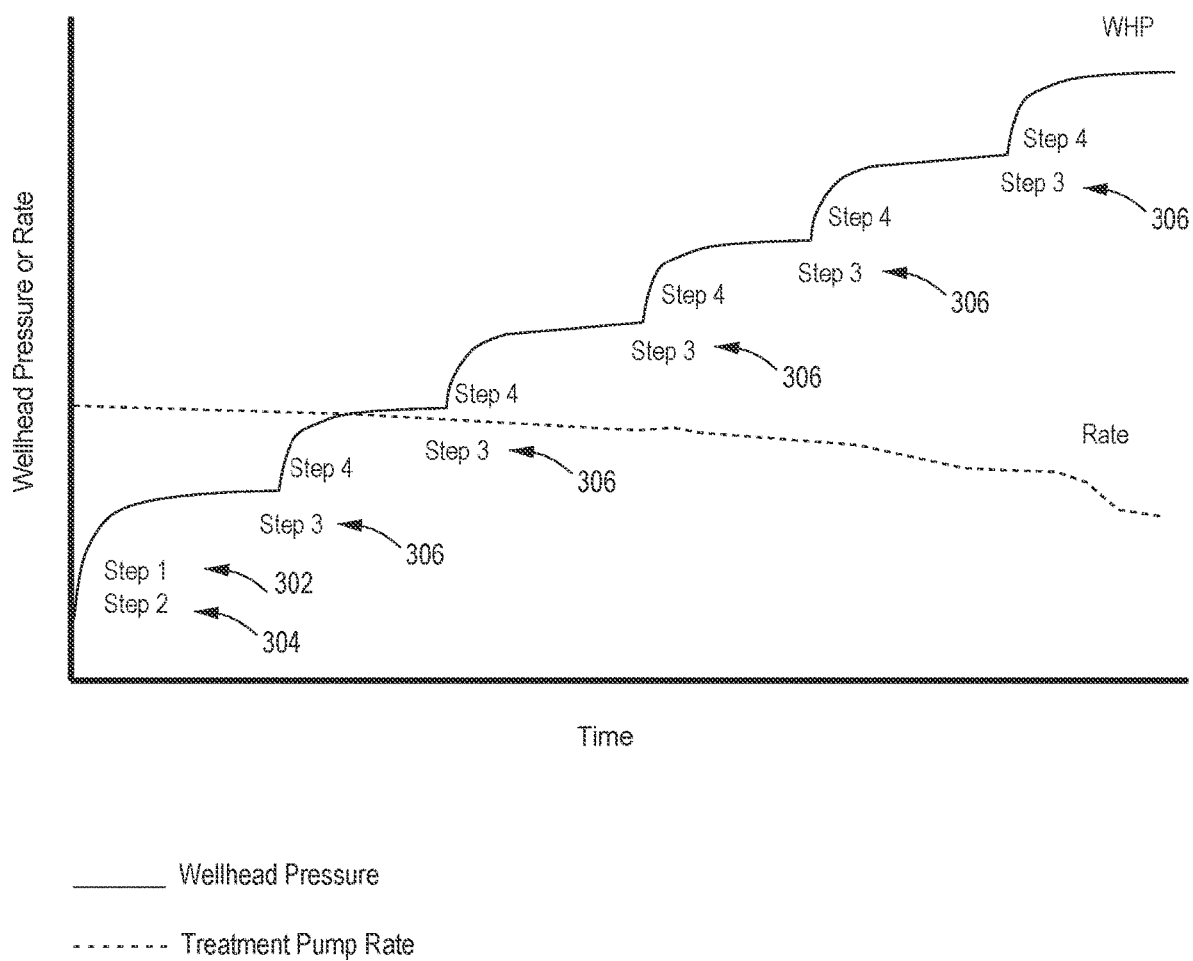
FIG. 3B depicts in at least one specific embodiment how wellhead pressure and rate can vary over time.

During the pumping in of the treatment composition, the downhole pressure gradually increases, as illustrated in FIG. 3B. When the pressure reaches the reopening pressure of the IU's connected to the main fractures, the liquid that includes the LPG preferably flows into the IU's and contacts the matrix surrounding the IU's and the interface. It is contemplated that a substantial amount and, in some cases, the majority, of the trapped fracturing water resides in the matrix accessed by these IU's and can be contacted with the treatment composition including the LPG and surfactant(s). Preferably, the LPG flowing through the IU's to the matrix results in release of trapped water therein as well as swelling and mobilization of any oil it contacts.

It is contemplated that in at least certain specific embodiments, most of the fracture water leaks off into the matrix via a network of IU's because neither the leak-off area nor the leak-off coefficient of the planar fracture alone is sufficiently high to disperse the total volume of fracture water. Some have estimated the leak-off from the planar fractured system into the matrix as approximately 10% of the fracture water that was added during the fracturing operation, which indicates the fracturing fluid is leaking off into some additional fracture network that is accessed during the fracturing process. It is contemplated that this secondary fracture network of IU fractures may hold as much as 90% or more of the fluid that was injected during hydraulic fracturing. Preferably, the treatment methods described herein result in accessing the IU's that make up the secondary fracture network. Preferably, the volume of the treatment composition is greater than the pore volume of the propped fracture, so that the treatment composition can reach and occupy the IUs. The treatment pressure during practice of the method should be sufficiently high to reopen the IU's so the LPG and surfactant(s) can be dispersed into the matrix.

Figure 4:
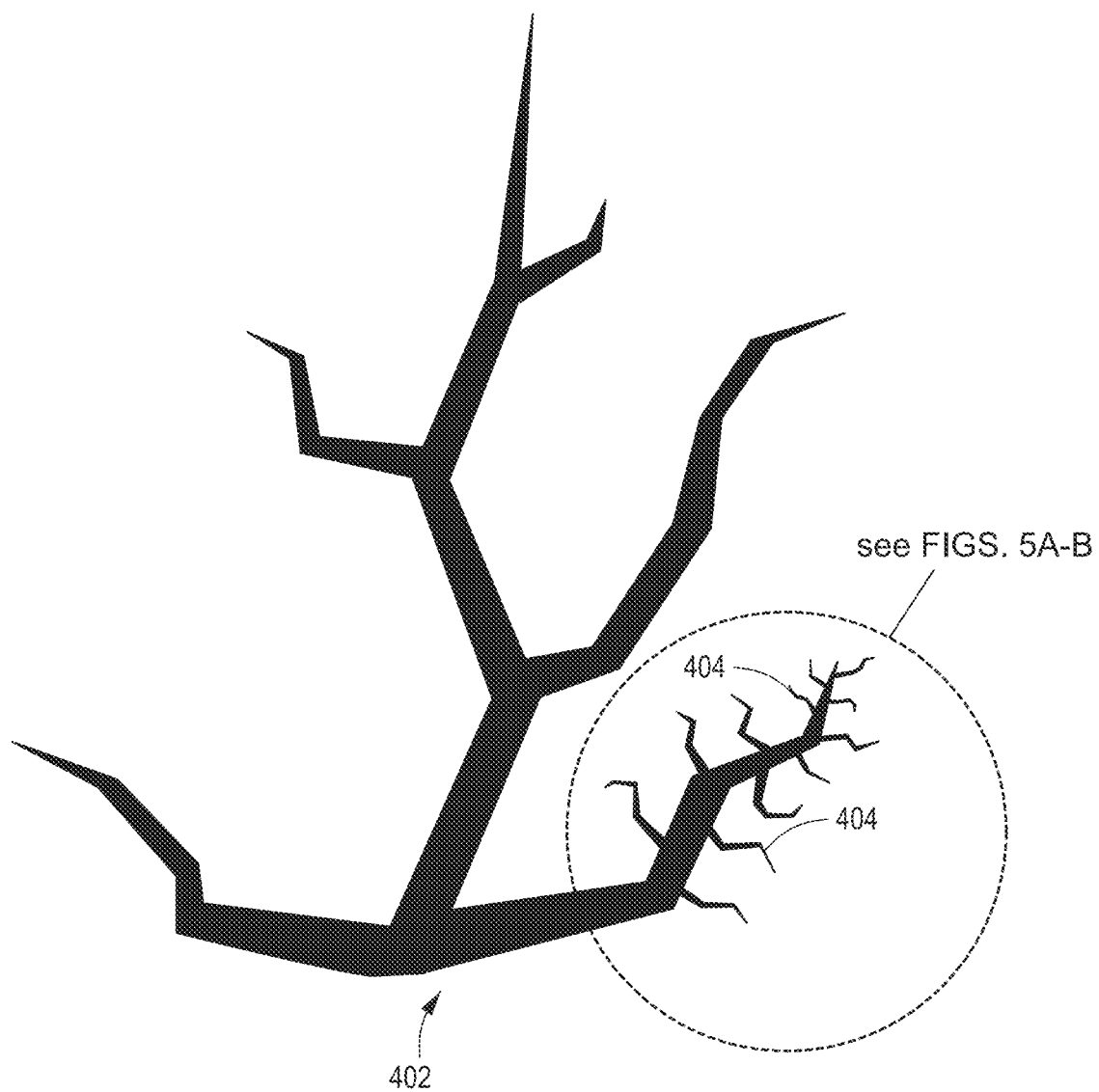
FIG. 4 depicts a hydraulic fracture.

Referring to FIG. 4, based on a simple material balance of the fracture fluid, the created area of these IU fractures 404 is expected to be at least an order of magnitude larger that the main propped hydraulic fracture 402. This conclusion is consistent with observed field data from multiple shale basins where it has been reported that generally less than half of the frac fluid is produced back. During and after fracture stimulation it was also reported that excellent hydraulic conductivity existed between the wellbore and the main hydraulic fracture 402; however, the induced network of IU fractures 404 have had a tendency to close completely, thus trapping the injected frac fluid.

Figure 5A:
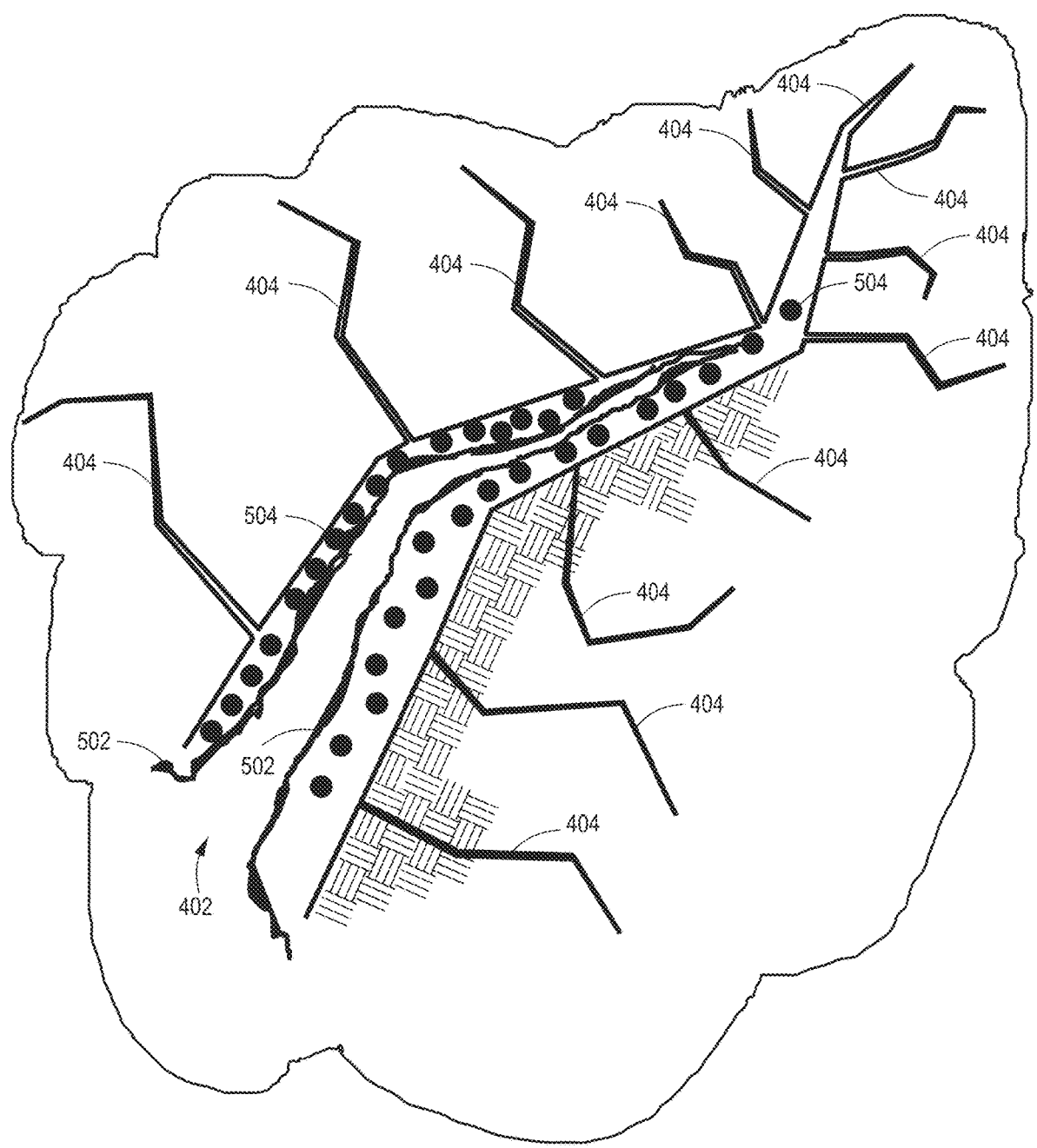
FIG. 5A is another depiction of a hydraulic fracture.
Figure 5B:
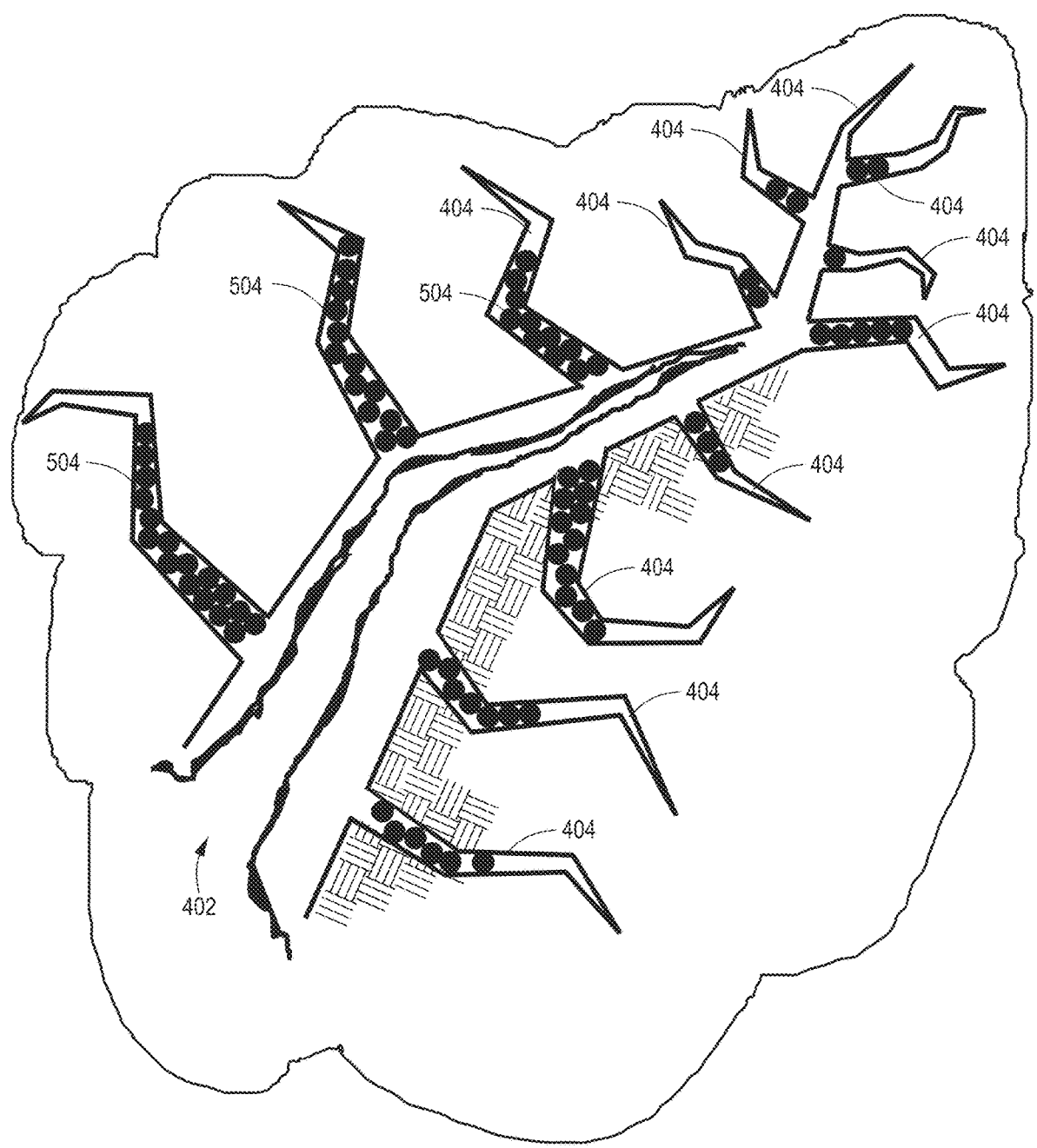
FIG. 5B is yet another depiction of a hydraulic fracture.

Hydrocarbon production has been seen to benefit from various well treatment protocols that are either part of the treatment methods described herein or in addition to such protocols. For example, benefits have been seen from increasing the number of perforation intervals that contribute to the flow of production fluids. In some cases, a certain number of perforation intervals are non-contributing for whatever reason, sometimes due to precipitate formation. Even though they were hydraulically fractured, trapped water, precipitates, and other substances may prevent recovering of the hydrocarbons. Another well treatment protocol that may be included is the opening of blocked intervals that may not yet be depleted. Yet another protocol has been to take steps to reduce the formation damage at or near the wellbore. And taking steps to recover some of the initial fracturing fluid has in some cases opened up additional parts of the matrix thus enhancing the existing fracture flowpaths. There are miscibility benefits (swelling and oil mobilization) wherever LPG 502 comes in contact with residual hydrocarbons 504 (e.g., oil) residing either in the propped fractures or along any of the fracture/IU/matrix interfaces as illustrated in FIG. 5A and FIG. 5B.

FIG. 3A illustrates steps that are part of one or more specific embodiments of methods for treating hydraulically fractured formations. In the first stage 302 ("Step 1") of an illustrative treatment method on an approximately 5,000 foot wellbore, 1,000 barrels of a liquid composition are pumped over a period of 1 hour that includes LPG, lubricant, surfactant, defoamer, and non-emulsifier is pumped into a wellbore until a pressure response is observed due to a near wellbore fill up of the existing SRV. With this first stage 302 a purpose is to contact the existing SRV with LPG solvent and mobilize residual oil through swelling (miscibility between LPG and residual oil is expected to be achieved at current reservoir pressure). In the second stage 304 ("Step 2"), for approximately 5 minutes, a 20 barrel diverter slug is pumped into the wellbore. The diverter slug includes LPG, self-dissolving perf balls (and optionally a gellant, crosslinker and breaker). At least one purpose of the diverter stage is to temporarily block perforations that took the initial treatment fluid. In the third stage 306 ("Step 3"), for approximately six hours, from 4,000 to 5,000 barrels of the same composition used in the first stage (LPG, lubricant, surfactant, defoamer, and non-emulsifier) are pumped into the wellbore. A purpose of the third stage is to access and stimulate previously non-contributing zones/SRV. Diversion will enable access to additional SRV which will provide incremental primary recovery and stimulation of that newly opened SRV with miscible LPG solvent. The third step may alternatively be broken up into multiple stages, alternating 1,000 to 1,500 barrels of LPG (with lubricant, surfactant, defoamer, and non-emulsifier) followed by diverter stages as described above over approximately six hours to effectively access additional SRV. A purpose of the alternative version of stage three is to continue the cycle of opening zones, then temporarily blocking those new zones with diverter to allow for more effective access and stimulation of additional zones as shown in FIG. 3B.

As discussed elsewhere herein, a chemical compound can be utilized that can reduce friction of LPG as it is pumped downhole during a treatment program. That chemical can act as a lubricant during, for example, bull-heading and placement of LPG within a formation. In addition to standard equipment that can be used to pump LPG into the wellbore, in at least certain embodiments of the methods and systems, chemical pumps are required to pump the lubricant so that it mixes with the LPG, and the lubricant is preferably fully soluble in LPG. At least one or more embodiments of the methods and systems include pumping LPG at various pressures and speeds to increase oil production in existing wells. The lubricant referenced above can be used to help reduce the friction between the LPG and the wellbore material and formation to help keep pressures down as the pumping occurs. This lubricant does not interact unfavorably with any of the other chemicals being pumped during the treatments.

The treatment composition useful in the treatment methods discussed herein are preferably a blended product formulated as a blend of various components described elsewhere herein, e.g., LPG mixed with two or more different nonionic alcohol ethoxylate surfactants, a cationic non-emulsifier, and an alcohol-based defoamer to ensure that the composition is a non-foaming non-emulsion, single-phase solution when being pumped into the wellbore, and thence into the fractures and matrix especially the matrix sharing an interface with the fractures, and also IU's in the matrix. Also, as discussed elsewhere herein, the surfactant(s) are partially soluble in water, and in one or more specific embodiments partition preferentially to any formation water, including connate or residual fracturing water within the fractures or reservoir matrix.

Accordingly, in one or more specific embodiments the LPG acts as a delivery system for the surfactant(s). Preferably, by combining the LPG with certain surfactant(s), exemplified by the specific surfactant compounds disclosed herein, a maximum or at least sufficient amount of surfactant(s) end up reaching maximum or at least sufficient amounts of the trapped fracture water, including water in the fractures themselves, as well as water trapped in parts of the matrix including the IU's. One beneficial property of the surfactant(s) disclosed herein is that the surfactant(s) are fully soluble in the LPG so that a single-phase solution is formed, and preferably has no or essentially no water or added gas such as nitrogen or carbon dioxide, and thus the liquid LPG solution is able to flow more easily into the desired parts of the fractures and matrix than if the LPG were part of a multi-phase composition or included water or gas. Another beneficial property of the particular surfactant(s) disclosed herein which provides superior and unexpected results is that the same surfactant(s) that are fully soluble in LPG are also fully soluble in water, and when the surfactant(s) make contact with water while they are still dissolved in the LPG, e.g., trapped water residing in the fracture(s) and/or matrix, those same surfactants begin to partition favorably into that water where they then begin to decrease the surface tension and have other results as described elsewhere herein. For example, when the surfactants start to contact the water, a significant portion of the surfactants (over 50%) migrates to the water (partitions), and that portion is dissolved into the water (including any existing aqueous mixture or solution that includes water), thus forming an aqueous solution that includes a majority of the surfactant(s). Preferably, at that point, there are at least two different phases within the fractures and matrix: An LPG phase and a water/aqueous phase. Once the surfactant(s) become part of the water phase, they lower the surface tension of that water including the water adsorbed onto the rock surface, which changes the wettability of the rock surface, from water-wet to oil-wet. The change in wettability in turn allows oil that was trapped within the rock matrix to migrate away from the rock and combine with the LPG with which it is miscible. It is contemplated that, in at least one of the preferred embodiments, the surfactant(s) preferentially adhere(s) to the rock surface, and the surfactant(s) has/have a greater affinity for water than for oil. Consequently, the water adsorbs on the rock surface, relieving oil in the process, thereby mobilizing oil that would have otherwise been tightly bound to the rock. Once the oil and the LPG mix, that mixture can more easily flow back during any production or recovery of the residual oil, which is part of certain specific embodiments of the treatment method disclosed herein. Thus, the LPG acts not only as a delivery system for the surfactant(s) on the way into the wellbore, but also acts as a delivery system for the new oil production, i.e., for producing the residual oil, and thus increasing the hydrocarbon production from the well.

In one or more specific embodiments of the method, the treatment composition that is pumped into the wellbore includes less than 0.005% water and no gas at all. The term "gas" includes, for example the gas form of nitrogen, carbon dioxide, and natural gas such as ethane, propane, butane, etc. The term "essentially no water or gas" as used herein means that to the extent any water or gas is present in the treatment composition, that water or gas does not interfere substantially with the performance of the treatment composition. For example, an undue amount of liquid water in the treatment composition may form a solution with a sufficient amount of the surfactant(s) present in the treatment composition to inhibit those surfactant(s) from performing one of its/their primary functions, which is to dissolve into the residual fracture water that resides in the hydraulic fractures or matrix. At the very least, including water in the treatment composition or otherwise pumping or introducing "new water" to the fractures makes the treatment composition less efficient and effective and even has the potential result of leaving the new water in the fractures or matrix which is counterproductive. As discussed in more detail herein, one of the objectives of at least certain specific embodiments of the methods disclosed herein is to remove water from the existing hydraulic fractures or matrix, especially fracture water, i.e., residual water that was added during the hydraulic fracturing operation, but still remains in the hydraulic fractures. The presence of gas in the treatment composition also has a negative impact, but for different reasons, namely, that the presence of gas effectively prevents the liquid composition from passing into the parts of the formation that include the trapped water. The intentional addition of gas in the form of $CO_2$ or $N_2$, for whatever reason, for example, to extend or displace the treatment volume, will cause foaming or emulsions which will tend to block access to IUs and the matrix, and seriously impair the effectiveness of the treatment process. Therefore, it is preferred that any treatment composition substantially excludes any added gas, including $CO_2$ or $N_2$ or, alternatively, that those added gases be present in insignificant amounts, such that the gases would not result in formation of any substantial amounts of foam or emulsion.

It is contemplated that one of the unexpected results of the treatment composition is the improved ability to remove residual oil. At least one of the factors contributing to the unexpected results is the combination of LPG with a surfactant that is partially soluble in LPG and partially soluble in water, i.e., at a minimum the surfactant is amphipathic with LPG and water. And a factor that provides even more unexpectedly superior results is a composition that includes surfactant(s) that partition favorably to water. That is, for example, the nonionic alcohol ethoxylates disclosed herein migrate more readily into the water phase and out of the LPG phase, and in the water phase the surfactant(s) lower the surface tension of that water including any water adsorbed onto the rock surface within the matrix and/or fracture network including IU's. As discussed elsewhere herein, this dynamic activity results in releasing water from the rock surface and changing the rock wettability from water-wet to oil-wet. In one or more embodiments where any particular part of the formation, e.g., matrix, is oil-wet, it is contemplated that the surfactant(s) help or cause any free water to then adsorb to the rock surface, thus releasing a certain amount of residual oil.

EXAMPLES

Example 1

Certain partitioning tests were performed with an example of a treatment composition formed of LPG, surfactant(s), defoamer(s), lubricant(s), and non-emulsifier(s). As shown in Table 1 below, the surfactants in the treatment composition partitioned to the water phase in laboratory testing at a rate of greater than 50%. The amounts of surfactants in the composition were selected to represent the potential range that may be used in actual field applications, i.e., 1000 ppm and 2000 ppm. These tests were conducted by first combining the LPG-containing solution with the surfactant solution. Pentane was selected as the LPG for laboratory purposes, and the test was performed at atmospheric pressure. The solution of pentane and surfactant(s) was mixed 50/50 (by volume) with freshwater to simulate its interaction with fracturing water encountered in the formation. After shaking, the samples were observed to readily split into a LPG phase and a water phase. Samples were taken from each phase and tested for the presence of the surfactants.

TABLE 1

| Dosage (ppm in Pentane) | % In Water Phase |
|---|---|
| 2000 | 56.51% |
| 1000 | 53.08% |

Example 2

An additional sample was tested, using the same procedure as in Example 1 except that the surfactant was initially in the water and, when mixed with LPG, some of the surfactant partitioned into the LPG. This test was done using a solution of surfactant(s) in water in an amount of 1,000 ppm, which was then mixed with LPG. The results (shown in Table 2) show that less than 35 percent of the surfactant partitions into the LPG phase.

TABLE 2

| Dosage (ppm in Pentane) | % In Water Phase |
|---|---|
| 1000 | 67.37% |

Example 3

An example was then performed to measure the effect of the partitioned surfactant(s) in the water phase on reducing the surface tension between the water and the rock face. As discussed elsewhere herein, the reduction in surface tension helps remove the water from inside the fractures and matrix pore throats where the water is in some cases adsorbed on the rock surfaces which traps the oil; and thus frees up the oil so that it can be recovered.

A partitioned sample was tested in a tensiometer and compared to the same water source with no surfactant. Also, a dose-response curve was completed for the untreated source water to show the impact of parts per million partitioning and the reduction in surface tension.

Figure 6:
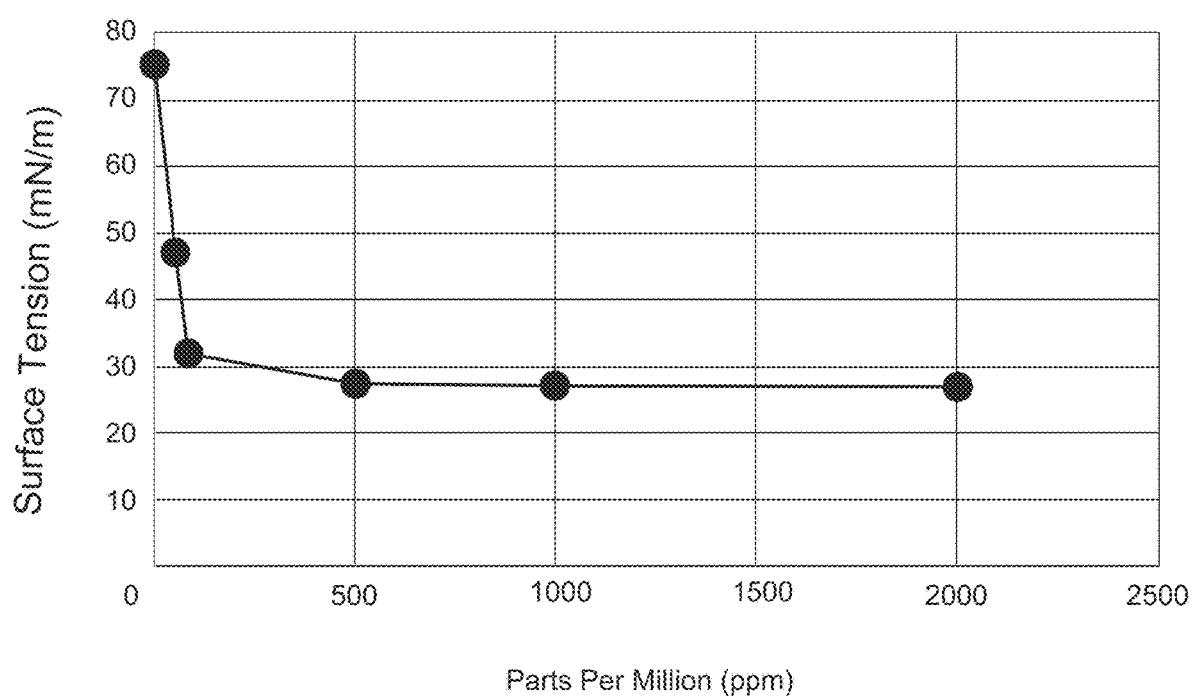
FIG. 6 is a plot showing surface tension versus composition amounts.

As seen in FIG. 6, there is unexpectedly steep and dramatic reduction in surface tension, but the behavior of the surface tension resembles a hockey stick because it levels off at a relatively small concentration. More specifically, the surface tension of the sample reaches a point corresponding to the "critical micelle concentration" (CMC) of the surfactant dissolved in water. As shown in FIG. 6, the CMC was observed to be 100 ppm, i.e., the combination of surfactant(s), non-emulsifier, and defoamer blend was/were mixed with water at a concentration of 100 ppm. The surface tension of that sample was measured and then compared to the surface tension of water without any surfactant. The measured surface tension of the water alone was 73, while the surface tension of that water mixed with the surfactant was 30.2 (at 100 ppm), thus demonstrating the surface tension lowering effect of the surfactant(s). Surprisingly, the use of more surfactant/non-emulsifier/defoamer blend in the water beyond 100 ppm, which provided the CMC for that solution, did not provide substantially higher reduction in surface tension, which indicates that the particular surfactant(s) when dissolved with LPG as part of a treatment can be surprisingly effective even at relatively low concentrations.

Therefore, based on the measured partitioning rates shown in Tables 1 and 2 (greater than 50% of the surfactant either partitions to or remains in the water phase), and using LPG with surfactant/non-emulsifier/defoamer blend concentrations of from 1,000 to 2,000 ppm, it can be concluded that any water in the formation, e.g., the fractures and/or matrix, will receive a surprisingly high degree of benefit via the amphipathic surfactant blends disclosed herein. These tests reveal that, in addition to the type(s) of surfactant(s) included in the treatment composition, the amount of those surfactant(s), e.g., surfactant concentration, plays a critical role in the effectiveness of the treatment method. For example, in terms of reducing surface tension, it is the amount of the surfactant(s) that partitions over to the water phase that is important in evaluating the surface reducing capacity of the surfactant(s), and a preferred amount is an amount representing critical micelle concentration.

Generally, with respect to surface tension, the surfactants described herein reduce the surface tension between oil and water. Relatively speaking, a high IFT (interfacial tension) between two fluids means that those two fluids, e.g., water and oil, want to keep to themselves. For example, it is widely recognized that water wants to keep to itself, and oil wants to keep to itself (oil and water don't mix). Without a surfactant, bubbles or droplets of oil are naturally entrained in water, and the oil bubbles or droplets are relatively large and relatively rigid in shape and structure. Introducing the surfactant reduces or relaxes the IFT, consequently the oil bubbles or droplets get smaller and are much more flexible, thus it becomes easier for them to squeeze through very small pore openings that they would not have been able to in their unaltered state.

Example 4

A test was carried out to demonstrate the importance of the non-emulsifier as well as the relative efficacy of one non-emulsifier over another, both of which are amphipathic relative to LPG and water. As noted elsewhere herein, it is desirable to avoid the creation or presence of any emulsion in either the treatment composition being pumped into the wellbore or the recovery composition that is being removed from the matrix, fractures and wellbore. Thus, it is antithetical to at least preferred embodiments of the treatment method and composition to include an emulsifier, i.e., any substance that creates an emulsion. However, even beyond that, preferred embodiments of the treatment method and composition include non-emulsifiers, which inhibit or prevent formation of an emulsion. First, the surfactant(s) described herein tend to create an emulsion, so there is a need to have a non-emulsifier to counter that tendency to create an emulsion. Second, the inventors have recognized that crude oil often includes natural emulsifiers, so that in the absence of a non-emulsifier a composition that includes residual oil may have a tendency to form an emulsion, which the inventors recognize reduce the ability to remove the residual oil from the formation, and thus impair the effectiveness of the methods described herein. As discussed elsewhere herein to the extent the residual oil is part of an emulsion it will not be part of the LPG phase that is separate from the water (or aqueous) phase and, consequently, is less likely to be removed from the matrix and fracture system. For that reason, a preferred embodiment of the method includes a non-emulsifier that inhibits and preferably prevents the formation of an emulsion.

Figure 7A:
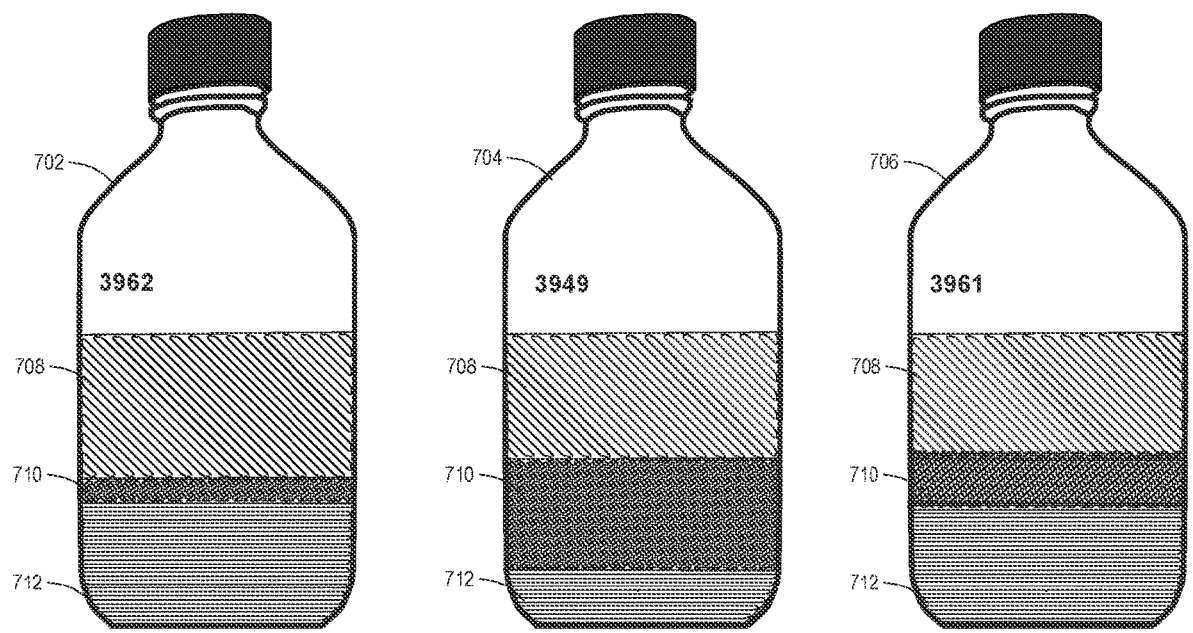
FIG. 7A is an illustration representing three different compositions having different layers.

In this example, two different non-emulsifiers were tested, and the results of the testing are shown in the illustration in FIG. 7A. Two acceptable non-emulsifiers were identified, (1) a non-ionic compound, specifically, a non-ionic polyester, and (2) a cationic compound, specifically, a cationic quaternary ammonium compound. However, testing demonstrated unexpectedly superior results for the cationic compound over the non-ionic compound. Accordingly, in a preferred embodiment, the treatment method and the treatment composition include a cationic compound, most preferably a quaternary ammonium compound that is amphipathic to both LPG and water. Based on the test results in a preferred embodiment of the treatment method, either no emulsion or essentially no emulsion forms between the LPG phase that includes the residual oil and the surfactant-laden water phase. As discussed elsewhere herein, the presence of any emulsion or any substantial emulsion would impede the ability of the treatment composition, which includes surfactant dissolved in LPG, to penetrate deep into the matrix and carry that surfactant deep into the matrix, and also would impede the ability of the LPG on the return trip to flow back and bring with it the water and residual oil that was trapped in the formation.

FIG. 7A is an illustration showing the influence of different non-emulsifiers on water-oil mixtures. The bottle 704 marked "3949" in the middle shows a very large layer of emulsion 710 between the oil phase 708 (upper) and water phase 712 (lower). The bottle 706 marked "3961" on the right shows a better separation between oil and water, but the emulsion 710 has a very ragged edge at the interfaces between the emulsion and the oil phase 708 (upper) and water phase 712 (lower). The sample in the bottle 702 marked "3962" showed results superior to the results of the other two samples. That sample showed clean interfaces between the oil phase 708 and water phase 712 and no visible emulsion 710 between them at all.

As noted elsewhere herein, a preferred method, composition, and system includes a defoamer, which inhibits or prevents formation of foam, and/or ensures that either no foam or a limited amount of stable foam forms within the formation when the treatment composition is present and also that the production composition does not foam during a flowback stage. The defoamer is soluble in the LPG so it remains in the LPG phase of the treatment composition when it is being pumped into the formation. Since the defoamer remains in the oil phase (which includes LPG) it helps ensure that any or all LPG that converts to the gas phase on flowback will not create a foam column and impede flowback at all or to any substantial extent. Including the defoamer in the composition helps ensure that the alcohol ethoxylate surfactant(s) acts mainly on the water and do not create any substantial emulsions or foam that could negatively impact the overall treatment.

The test results shown in Table 3 show the foam height depletion over a period of time of different samples having different formulations, including the following: (1) DI water combined with surfactants and non-emulsifier added at the measured partitioning rate for various system treat rate levels; (2) Same as (1) but with the defoamer added in at various treat rate levels representing 50%, 100%, and 150% of the treatment level in the recommended composition.

Table 3 shows that the foam height depletion has a 4 times to 5 times faster rate (after 15 minutes) when the defoamer is added to the solution. The height of any foam column that form subsides over time. Thus, the term "reduction" is a measurement of the height of a foam column to subside when measured vertically. The results show that when no defoamer is added, the foam does slowly subside over time—down to 61% of the total original height after 15 minutes. However, when the defoamer is added, the rate of foam height depletion is much greater—down to only 12% of the original foam volume in one case after 15 minutes. The testing shows that the more defoamer is added, the faster the rate of depletion is identified. The results also show that when brine or oil is present in the solution that no foam forms. Also, as noted above, foam tends to form when LPG and components from any residual oil form natural gas during their travel toward the wellbore along with residual water. However, the addition of the identified defoamer to the sample that includes LPG and surfactants dramatically reduces the potential negative impacts of the surfactants during treatment.

mixed with the composition at a rate of from 0 to 5,000 ppm of the treatment composition.

Note that LPG LUB 1000 or other phosphate ester gellants may be applied whenever a viscosity increase is necessary during any treatment process. For example, the lubricant or gellant should be mixed with the composition being pumped into the wellbore during mechanical diversion (e.g., when pumping slugs that include diverter balls) at rates of 5,000-20,000 ppm or during any chemical diversion stages at rates of 10,000-40,000 ppm.

With this treatment, LPG XL 1500 or other crosslinkers may be applied whenever a viscosity increase is necessary during the treatment process. For example, the crosslinkers should be mixed with the composition being pumped into the wellbore during mechanical diversion (e.g., when pumping slues that include diverter balls) at rates of 2,000-6,000 ppm or during any chemical diversion stages at rates of 4,000-10,000 ppm. A variety of different types of gel breakers will be utilized to break the viscous gel created by this gellant-crosslinker system.

What is claimed as the invention is:

1. A method for treating a hydrocarbon-bearing formation previously subjected to hydraulic fracturing comprising:
    (a) pumping into a wellbore a non-emulsified treatment composition comprising liquefied petroleum gas (LPG), one or more surfactants, a non-emulsifier, and a defoamer; wherein the non-emulsified treatment composition contains no separately added water;
    (b) causing the treatment composition to make contact with water residing in the formation such that no emulsion is formed with the water residing in the formation,

TABLE 3

| Product | Fluid | Dosage (ppm) | Defoamer Rate | Foam Height (0 min) | (1 min) | (5 min) | (15 min) |
|---|---|---|---|---|---|---|---|
| Surfactants(s) + Non-Emulsifier | DI Water | 1000 | 0 | 100% | 97% | 85% | 77% |
| Surfactants(s) + Non-Emulsifier | DI Water | 500 | 0 | 100% | 90% | 72% | 61% |
| Surfactants(s) + Non-Emulsifier | DI Water | 500 | 0.5X | 100% | 56% | 28% | 17% |
| Surfactants(s) + Non-Emulsifier | DI Water | 500 | 1.0X | 100% | 45% | 30% | 14% |
| Surfactants(s) + Non-Emulsifier | DI Water | 500 | 1.0X | 100% | 25% | 13% | 12% |
| Surfactants(s) + Non-Emulsifier | Brine Only | 500 | 0 | No foam | — | — | — |
| Surfactants(s) + Non-Emulsifier | DI Water + Oil | 500 | 0 | No foam | — | — | — |

Example 5

In this example, a phosphate ester lubricant (LUB 1000) was included in an LPG treatment composition to decrease back pressure when pumping treatment composition into a wellbore. Also included in the composition was a crosslinker (LPG XL 1500) which interacted with the phosphate ester to form a light gel which may be applied as a well cleanout sweep during the treatment. In at least certain embodiments of the methods and compositions, the gel was included in the diverter slug and was an alternative method to the use of diverter balls.

Example 6

In this example, certain chemicals were included in the composition along with the LPG during well treatments in the following manner: One of the surfactant blends (designated LPG SURF 1100) was mixed continuously with the treatment composition that included LPG at a rate ranging from 500 to 2,000 ppm based on the rate of the overall treatment composition that was being pumped into the wellbore. A lubricant/gellant (LPG LUB 1000) was also (c) recovering a non-emulsified production composition that includes (i) residual hydrocarbons, (ii) a portion of the LPG that was previously pumped into the wellbore in step (a), (iii) a portion of the water that resided in the formation and (iv) a portion of the one or more surfactants that were pumped into the wellbore in step (a).

2. The method of claim 1 wherein causing the treatment composition to make contact with water residing in the formation in step (b) results in over half of the amount of the one or more surfactants to partition into at least a portion of the water residing in the formation.

3. The method of claim 1 wherein causing the treatment composition to make contact with water residing in the formation in step (b) results in all of the one or more surfactants to partition into at least a portion of the water residing in the formation.

4. The method of claim 1 wherein the defoamer is an alcohol-based defoamer.

5. The method of claim 1 in which the production composition is recovered in step (c) from the same wellbore into which the treatment composition was pumped in step (a).

6. The method of claim 1 in which the hydrocarbon-bearing formation has a fracture pressure, an induced unpropped microfracture (IU) re-entry pressure and a wellbore region, wherein the pressure within the wellbore region is maintained above the induced unpropped microfracture (IU) re-entry pressure and below the fracture pressure.

7. The method of claim 1 wherein at least one of the one or more surfactants is a linear or branched fatty alcohol with an ethoxylation degree that is between 3 and 20.

8. The method of claim 1 wherein each of the one or more surfactants is fully soluble in both the water and the LPG.

9. The method of claim 1 wherein the defoamer in the treatment composition is fully dissolved in the LPG of the treatment composition and stays fully dissolved in the portion of the LPG contained in the recovered production composition.

10. The method of claim 1 wherein the treatment composition is pumped into the wellbore in three or more pumping stages in step (a).

11. The method of claim 1 wherein the production composition further comprises a portion of the defoamer that was previously pumped into the wellbore in step (a), and the portion of the defoamer in the production composition causes reduction in foaming potential of the LPG in the production composition during flowback.

12. A method for treating a hydrocarbon-bearing formation previously subjected to hydraulic fracturing comprising:
(a) pumping into a wellbore a first volume of a non-emulsified treatment composition comprising liquefied petroleum gas (LPG), one or more surfactants, a non-emulsifier, and a defoamer; wherein the first volume of non-emulsified treatment composition contains no separately added water;
(b) pumping into the wellbore a second volume of a non-emulsified treatment composition comprising LPG, one or more surfactants, a non-emulsifier, a defoamer, and a diverter; wherein the second volume of non-emulsified treatment composition contains no separately added water;
(c) pumping into the wellbore a third volume of a non-emulsified treatment composition comprising LPG, one or more surfactants, a non-emulsifier, and a defoamer; wherein the third volume of non-emulsified treatment composition contains no separately added water;
(d) causing at least a portion of the first volume of non-emulsified treatment composition, at least a portion of the second volume of non-emulsified treatment composition, and at least a portion of the third volume of non-emulsified treatment composition to make contact with water residing in the formation such that no emulsion is formed with the water residing in the formation; and
(e) recovering a non-emulsified production composition that includes (i) residual hydrocarbons, (ii) a portion of the LPG that was previously pumped into the wellbore in steps (a), (b) and (c), respectively, (iii) a portion of the water that resided in the formation, and (iv) a portion of the one or more surfactants that were pumped into the wellbore in steps (a), (b) and (c), respectively.

13. The method of claim 12 additionally comprising monitoring wellhead pressure while pumping the first volume of non-emulsified treatment composition into the wellbore and altering the amount of the first volume of non-emulsified treatment composition based on the wellhead pressure reaching a first predetermined level before pumping the second volume of non-emulsified treatment composition.

14. The method of claim 13 additionally comprising monitoring the wellhead pressure while pumping the third volume of non-emulsified treatment composition into the wellbore and altering the amount of the third volume of non-emulsified treatment composition based on the wellhead pressure reaching a second predetermined level before pumping an additional volume of a non-emulsified treatment composition comprising LPG, one or more surfactants, a non-emulsifier, a defoamer, and a diverter.

15. The method of claim 12 wherein the first volume of non-emulsified treatment composition and the third volume of non-emulsified treatment composition include no diverter and wherein the first volume of non-emulsified treatment composition is greater in volume than the second volume of non-emulsified treatment composition.

16. The method of claim 15 wherein the diverter is a ball type diverter.

17. The method of claim 15 wherein the diverter is a chemical diverter.

* * * * *